United States Patent
Fortusini et al.

(10) Patent No.: US 10,684,419 B2
(45) Date of Patent: Jun. 16, 2020

(54) WAVEGUIDE CONNECTOR ELEMENTS AND OPTICAL ASSEMBLIES INCORPORATING THE SAME

(71) Applicant: CORNING OPTICAL COMMUNICATIONS LLC, Hickory, NC (US)

(72) Inventors: Davide Domenico Fortusini, Painted Post, NY (US); Lars Martin Otfried Brusberg, Corning, NY (US); James Scott Sutherland, Corning, NY (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 16/253,032

(22) Filed: Jan. 21, 2019

(65) Prior Publication Data

US 2019/0170945 A1 Jun. 6, 2019

Related U.S. Application Data

(63) Continuation of application No. PCT/US2017/042063, filed on Jul. 14, 2017.

(60) Provisional application No. 62/368,330, filed on Jul. 29, 2016.

(51) Int. Cl.
  *G02B 6/30* (2006.01)
  *G02B 6/13* (2006.01)
  *G02B 6/42* (2006.01)

(52) U.S. Cl.
  CPC ............... *G02B 6/305* (2013.01); *G02B 6/13* (2013.01); *G02B 6/421* (2013.01); *G02B 6/4249* (2013.01)

(58) Field of Classification Search
  CPC .................................. G02B 6/13; G02B 6/305
  See application file for complete search history.

(56) References Cited

U.S. PATENT DOCUMENTS

| 6,141,366 A | 10/2000 | Yoneda |
| 6,154,593 A | 11/2000 | Miura et al. |
| 6,438,295 B1 | 8/2002 | McGarry et al. |
| 6,697,554 B2 | 2/2004 | McGarry et al. |

(Continued)

FOREIGN PATENT DOCUMENTS

| CN | 102116898 B | 8/2012 |
| DE | 102011017329 A1 | 10/2012 |

(Continued)

OTHER PUBLICATIONS

Akiyama et al; "Air Trench Bends and Splitters for Dense Optical Integration in Low Index Contrast"; Journal of Lightwave Technology, vol. 23, No. 7, Jul. 2005; p. 2271-2277.

(Continued)

*Primary Examiner* — Rhonda S Peace
(74) *Attorney, Agent, or Firm* — Grant A. Gildehaus

(57) ABSTRACT

Optical waveguide connector elements for optical coupling optical components of an optical assembly, such as the edge coupling of optical printed circuit boards. In one embodiment, a waveguide connector element includes a first end face and a second end face, a pre-existing optical waveguide within or on a surface of the waveguide connector element, and a laser written optical waveguide optically coupled to an end of the pre-existing optical waveguide and extending toward one of the first end face and the second end face.

24 Claims, 28 Drawing Sheets

(56) References Cited

U.S. PATENT DOCUMENTS

| | | | |
|---|---|---|---|
| 6,768,850 | B2 | 7/2004 | Dugan et al. |
| 7,329,050 | B1 | 2/2008 | Dugan et al. |
| 7,409,118 | B2 | 8/2008 | Said et al. |
| 8,270,784 | B2 | 9/2012 | Thomson et al. |
| 8,270,788 | B2 | 9/2012 | Herman et al. |
| 8,270,792 | B1 | 9/2012 | Ng |
| 8,597,871 | B2 | 12/2013 | McLeod |
| 9,034,222 | B2 | 5/2015 | Koos et al. |
| 9,124,959 | B2 | 9/2015 | Xu et al. |
| 9,268,096 | B1 * | 2/2016 | Krasulick ............... G02B 6/30 |
| 9,594,220 | B1 | 3/2017 | Sutherland |
| 9,678,278 | B2 * | 6/2017 | Blaicher ............... G02B 6/138 |
| 9,766,411 | B2 | 9/2017 | Butler et al. |
| 9,933,574 | B1 * | 4/2018 | Zhang ...................... G02B 6/30 |
| 10,018,789 | B2 | 7/2018 | Wang et al. |
| 10,162,112 | B2 * | 12/2018 | Sutherland ............ G02B 6/125 |
| 10,234,644 | B1 | 3/2019 | Butler et al. |
| 10,310,195 | B2 * | 6/2019 | Collier ................... G02B 6/305 |
| 2002/0076655 | A1 * | 6/2002 | Borrelli ............... C03C 23/0025 430/321 |
| 2003/0007754 | A1 * | 1/2003 | Terashima ............... G02B 6/42 385/92 |
| 2003/0099452 | A1 | 5/2003 | Borrelli et al. |
| 2004/0252932 | A1 | 12/2004 | Shimizu et al. |
| 2004/0258359 | A1 | 12/2004 | Corkum et al. |
| 2005/0220404 | A1 | 10/2005 | Flers et al. |
| 2009/0310906 | A1 | 12/2009 | Miyatake |
| 2014/0126030 | A1 | 5/2014 | Crespi et al. |
| 2014/0177995 | A1 * | 6/2014 | Mohammed ............ G02B 6/36 385/14 |
| 2015/0268419 | A1 | 9/2015 | Van Steenberge et al. |
| 2016/0131842 | A1 | 5/2016 | Mahgerefteh et al. |
| 2017/0160490 | A1 * | 6/2017 | Zhang .................. G02B 6/3846 |
| 2017/0343734 | A1 * | 11/2017 | Collins ................. G02B 6/305 |
| 2018/0024292 | A1 * | 1/2018 | Beausoleil .............. G02B 6/26 385/14 |
| 2018/0172905 | A1 | 6/2018 | Fortusini et al. |
| 2018/0217326 | A1 * | 8/2018 | Brusberg ............... G02B 6/122 |
| 2018/0246279 | A1 * | 8/2018 | Florian Lohse ....... G02B 6/305 |
| 2018/0246286 | A1 * | 8/2018 | Lohse ...................... G02B 6/43 |
| 2018/0275342 | A1 * | 9/2018 | Shaw .................... G02B 6/2821 |
| 2018/0321451 | A1 * | 11/2018 | Zhao ........................ G02B 6/42 |
| 2019/0154931 | A1 * | 5/2019 | Masters ............... G02B 6/4227 |
| 2019/0170945 | A1 * | 6/2019 | Fortusini ............... G02B 6/305 |

FOREIGN PATENT DOCUMENTS

| | | |
|---|---|---|
| JP | 2004046031 A | 2/2004 |
| JP | 2005010373 A | 1/2005 |
| JP | 2005156945 A | 6/2005 |
| JP | 2006201014 A | 8/2006 |
| JP | 3925209 B2 | 6/2007 |
| JP | 4514999 B2 | 7/2010 |
| WO | 2018022318 A1 | 2/2018 |

OTHER PUBLICATIONS

Boisset et al; "Design and Construction of an Active Alignment Demonstrator for a Free-Space Optical Interconnect"; IEEE Photonics Technology Letters, vol. 7, No. 6 (Jun. 1995), pp. 676-678.
Brusberg et al; "Single-Mode Glass Waveguide Platform for DWDM Chip-To-Chip Interconnects"; IEEE (2012); pp. 1532-1539.
Brusberg et al; "Thin Glass Based Packaging Technologies for Optoelectronic Modules"; IEEE; (2009) pp. 207-212.
Cheng et al; "Dye-Doped Polymer Based Self-Written Waveguide for Optical Interconnection," Portable Information Devices, 2008 and the 2008 7th IEEE Conference on Polymers and Adhesives in Microelectronics and Photonics. Portable-Polytronic 2008. 2nd IEEE International Interdisciplinary Conference on, pp. 1-6, 2008.
Dai et al; "Deeply Etched SiO2 Ridge Waveguide for Sharp Bends"; Journal of Lightwave Technology, vol. 24, No. 12, Dec. 2006; pp. 5019-5024.
Deng et al; "Self-Aligned Single-Mode Polymer Waveguide Interconnections for Efficient Chip-To-Chip Optical Coupling", IEEE Journal of Selected Topics in Quantum Electronics, vol. 12, No. 5, (Sep. 2006) pp. 923-930.
Eaton et al; "Heat Accumulation Effects in Femtosecond Laser-Written Waveguides With Variable Repetition Rate"; Optics Express, vol. 13, No. 12, Jun. 2005; pp. 4708-4716.
Hiramatsu et al; "Laser-Written Optical-Path Redirected Waveguide Device for Optical Back-Plane Interconnects"; IEEE Photonics Technology Letters, vol. 16, No. 9, Sep. 2004; pp. 2075-2077.
Hirose et al; "Optical Component Coupling Using Self-Written Waveguides," Optical Communication, 2001. ECOC '01. 27th European Conference on, vol. 2, pp. 140 141, 2001.
Huang et al; "Ultrafast Laser Fabrication of 3D Photonic Components in Flexible Glasses"; OFC 2014; OSA 2014; 3 pages.
International Search Report and Written Opinion of the International Searching Authority; PCT/US2017/042063; dated Oct. 18, 2017; 16 pages; European Patent Office.
Jackson et al; "A High-Density, Four-Channel, OEIC Transceiver Module Utilizing Planar-Processed Optical Waveguides and Flip-Chip, Solder-Bump Technology" Journal of Lightwave Technology, vol. 12, No. 7, Jul. 1994, pp. 1185-1191.
Koos et al; "Photonic Wire Bonding: Nanophotonic Interconnects Fabricated by Direct-Write 3D Lithography"; IEEE, (2013) pp. 1-4.
Kwack et al; "180° Light Path Conversion Device With Tapered Self-Written Waveguide for Optical Interconnection"; IEEE Photonics Technology Letters, vol. 22, No. 15; (Aug. 2010); pp. 1126-1128.
Strelstov et al; "Laser-Written High-Contrast Waveguides in Glass"; Proc. of SPIE, vol. 7366; pp. 73661I-1-73661I-8.
Lindenmann et al; "Connecting Silicon Photonic Circuits to Multicore Fibers by Photonic Wire Bonding"; Journal of Lightwave Technology, vol. 33, No. 4 (Feb. 2015) pp. 755-760.
Lindenmann et al; "Photonic Wire Bonding for Single-Mode Chip-To-Chip Interconnects"; IEEE; (2011); pp. 380-382.
Marcuse; "Length Optimization of an S-Shaped Transition Between Offset Optical Waveguides"; Applied Optics; vol. 17, No. 5 (Mar. 1978) pp. 763-768.
Nasu et al; "Developments in Laser Processing of Silica-Based Planar Lightwave Circuits"; Proc. of SPIE, vol. 6107 )2006) pp. 61070B-1-61070B-9.
Nasu et al; "Low-Loss Waveguides Written With a Femtosecond Laser for Flexible Interconnection in a Planar Light-Wave Circuit"; Optics Letters, vol. 30, No. 7; (Apr. 2005) pp. 723-725.
Nasu et al; "Waveguide Interconnection in Silica-Based Planar Lightwave Circuit Using Femetosecond Laser"; Journal of Lightwave Technology, vol. 27, No. 18; Sep. 2009; pp. 4033-4039.
Ozawa et al; "Self-Written Waveguide Connection Between VCSEL and Optical Fiber With 45 Mirror Using Green Laser"; IEEE Photonics Technology Letters, vol. 18, No. 3 (Feb. 2006); pp. 532-534.
Ryu et al; "Optical Interconnection for a Polymeric PLC Device Using Simple Positional Alignment"; Optics Express, vol. 19, No. 9; (Apr. 2011); pp. 8571-8579.
Schroder et al; "New Options for Chip-To-Chip Photonic Packaging by Using Thin Glass-Based Waveguide Substrates on Board and Module Level"; Proc. of SPIE, vol. 7607; (2010) pp. 76070F-1-76070F-10.
Sugihara et al; "Light-Induced Self-Written Polymeric Optical Waveguides for Single-Mode Propagation and for Optical Interconnections"; IEEE Photonics Technology Letters, vol. 16, No. 3, (Mar. 2004); pp. 804-806.
Thomson et al; "Ultrafast-Laser Inscription of a Three Dimensional Fan-Out Device for Multicore Fiber Coupling Applications"; Optics Express, vol. 15, No. 18; Sep. 2007; pp. 11691-11697.
Van Thourhout et al; "Technologies for On-Chip Optical Interconnects," Lasers and Electro-Optics Society, 2005. LEOS 2005. The 18th Annual Meeting of the IEEE, pp. 204-205, 2005.
Vazquez et al; "Integration of Femtosecond Laser Written Optical Waveguidesd in a Lab-On-Chip"; Lab O A Chip, vol. 9, No. 1; Jan. 2009; pp. 91-96.
Yagisawa et al; "Novel Trace Design for High Data-Rate Multi-Channel Optical Transceiver Assembled Using Flip-Chip Bonding",

(56) References Cited

OTHER PUBLICATIONS

Electronic Components and Technology Conference (ECTC), 2014 IEEE 64th, pp. 1048-1053, 2014.

Yanagisawa et al; "Film-Lever Hybrid Integration of AlGaAs Laser Diode With Glass Waveguide on Si Substrate"; IEEE Photonics Technology Letters, vol. 4, No. 1 (Jan. 1992); pp. 21-23.

Yoshimura et al; "Self-Organized Lightwave Network Based on Waveguide Films for Three-Dimensional Optical Wiring Within Boxes"; Journal of Lightwave Technology, vol. 22, No. 9; (Sep. 2004) pp. 2091-2100.

* cited by examiner

WAVEGUIDE CONNECTOR ELEMENTS AND OPTICAL ASSEMBLIES INCORPORATING THE SAME

PRIORITY APPLICATIONS

This application is a continuation of International Application No. PCT/US17/42063, filed on Jul. 14, 2017, which claims the benefit of priority to U.S. Application No. 62/368,330, filed on Jul. 29, 2016, both applications being incorporated herein by reference.

BACKGROUND

The present disclosure generally relates to high-bandwidth optical communication and, more particularly, to optical waveguide connector elements operable to optically couple various optical components.

Benefits of optical fiber include extremely wide bandwidth and low noise operation. Because of these advantages, optical fiber is increasingly being used for a variety of applications, including, but not limited to, broadband voice, video, and data transmission. Connectors are often used in data center and telecommunication systems to provide service connections to rack-mounted equipment and to provide inter-rack connections. Accordingly, optical connectors are employed in both optical cable assemblies and electronic devices to provide an optical-to-optical connection wherein optical signals are passed between an optical cable assembly and an electronic device.

As the bandwidth of optical transceiver devices increases by advanced techniques such as silicon-based laser systems and wavelength division multiplexing, large amounts of data must be electronically transferred from the active devices and associated electronics to electronic components of the computing device (e.g., a data switching device of a data center) for further processing (e.g., up to 100 Gbps per channel). Further, the size of optical transceiver devices (e.g., laser diodes, photodiodes) continues to decrease, which presents challenges in maintaining proper alignment between the transceiver device and the optical connector to which it is connected.

In silicon-based photonic devices, such as hybrid-silicon lasers and silicon optical modulators, optical signals are propagated through the device within optical waveguides. In some laser devices, the laser signals exit the device through a side facet such that the laser signal does not turn prior to being emitted. Currently, the alignment of the waveguides at the side facet to a mated optical connector requires an expensive and time consuming active alignment process (e.g., a vision-based active alignment process). Such active alignment processes add significant costs, and severely reduces throughput.

Accordingly, alternative devices including optical waveguides for improved optical coupling are desired.

SUMMARY

Embodiments of the present disclosure are directed to waveguide connector elements with optical waveguides that may be attached to optical printed circuit board edges to provide a compact, low-cost, high density connection to external optical fiber arrays. Internal waveguide fan-out structures within glass waveguide connector elements may be used to provide pitch and mode field conversion between optical printed circuit board waveguides and external fiber array connections, as shown in FIG. 1. In some embodiments, beam expansion lenses may also be laser written into the device to minimize sensitivity to lateral misalignments.

Laser written fan-out structures in ion exchanged waveguide glass substrates are also presented, where the optical fan-out waveguides are arranged to match optical fiber, connectors or photonic IC optical port pitches at one surface of the glass which contains ion exchanged waveguides close to the glass surface, as shown in FIG. 2.

The waveguide connector elements described herein provide a compact, flexible substrate where low-loss optical waveguides may be provided through small radius curves to enable right angle optical turns between optical printed circuit board waveguides and photonic integrated chip active or passive devices, and to reduce the overall height of (and thereby the overall packaging volume) of interconnections to optical printed circuit board-mounted photonic integrated chips.

Because optical waveguides may be written at arbitrary locations within the glass to waveguide connector elements using pulsed laser writing techniques, embodiments may provide two-dimensional interfaces to arrays of optical waveguides or devices, embodiments can convert between one- and two-dimensional optical arrays, and embodiments may be used as a furcation element or waveguide pitch converter.

In this regard, in one embodiment, a waveguide connector element includes a first end face and a second end face, a pre-existing optical waveguide within or on a surface of the waveguide connector element, and a laser written optical waveguide optically coupled to an end of the pre-existing optical waveguide and extending toward one of the first end face and the second end face.

In another embodiment, a waveguide connector element includes a first end face and a second end face, and a beam expanding lens at the first end face, wherein the beam expanding lens is a tapered structure that decreases in diameter from the first end face toward the second end face.

In yet another embodiment, an optical assembly includes an optical printed circuit board and a waveguide connector element. The optical printed circuit board includes an optical layer and a circuit board optical waveguide disposed within the optical layer. The optical printed circuit board includes an edge, wherein the circuit board optical waveguide terminates at the edge. The waveguide connector element includes an optical waveguide, wherein the waveguide connector element is coupled to the edge of the optical printed circuit board, and the optical waveguide is optically coupled to the circuit board optical waveguide.

In yet another embodiment, an optical assembly includes a waveguide connector element and a plurality of optical fibers. The waveguide connector element includes a first end face and a second end face, a plurality of pre-existing optical waveguides, and a plurality of laser written optical waveguides. The plurality of pre-existing optical waveguides is disposed within or on a surface of the waveguide connector element, and is arranged at a first pitch and extending from the second end face. The plurality of laser written optical waveguides is optically coupled to an end of the plurality of pre-existing optical waveguides and extends toward the first end face, the plurality of laser written optical waveguides configured as fan-out optical waveguides such that the plurality of laser written optical waveguides is arranged at a second pitch at the first end face. The second pitch is greater than the first pitch. The plurality of optical fibers is optically coupled to the plurality of laser written optical waveguides at the first end face.

In yet another embodiment, an optical assembly includes an optical connector, a plurality of pre-existing optical waveguides, and a plurality of laser written optical waveguides. The optical connector element includes a first end face and a second end face. The plurality of pre-existing optical waveguides is disposed within or on a surface of the optical connector element. The plurality of pre-existing optical waveguides is arranged at a first pitch and extends from the second end face. The plurality of laser written optical waveguides is optically coupled to an end of the plurality of pre-existing optical waveguides and extends toward the first end face. The plurality of laser written optical waveguides is configured as fan-out optical waveguides such that the plurality of laser written optical waveguides is arranged at a second pitch at the first end face, wherein the second pitch is greater than the first pitch. The optical assembly further includes an active optical component coupled to a surface of the optical connector element and optically coupled to the plurality of laser written optical waveguides.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

DETAILED DESCRIPTION

Embodiments described herein are directed to waveguide connector elements including optical waveguides for optical coupling optical components that provide low coupling loss, high optical interconnection density, high alignment tolerances high reliability and lower costs.

Compact high density optical connectors provide optical waveguides in one dimensional or two dimensional arrays where the waveguide centers are located precisely relative to one another as well as to external datum features. These datum features, such as pins or flats, constrain the motion of mated waveguide array connectors in three directions (X, Y, and θZ, where the waveguide axes are parallel to the z-axis).

In embodiments, a precision waveguide connector element is fabricated by redrawing a larger glass preform. As an example and not a limitation, a glass preform may be shaped with glass grinding processes that provide surfaces that are accurate to less than about 25 µm. In some embodiments, the preform may also include an array of holes formed on a precise pitch that accept core blanks to form optical waveguide arrays. During the redraw process, the preform surfaces scale precisely, allowing the resulting glass ferrule part to provide surfaces that are accurate to, without limitation, less than 1 µm, and preferably less than 0.5 µm. The outside surfaces of the glass waveguide connector element are precisely aligned to the internal array of optical waveguides. These outside surfaces serve as reference surfaces so that when two ferrules are inserted into a common C-shaped compression sleeve, their internal arrays of optical waveguides are aligned to each other to within 0.5 µm laterally (measured in a direction perpendicular to the waveguide axis).

In one application, the redrawn glass waveguide connector element with waveguides may be actively or passively aligned to waveguides that are embedded in an optical printed circuit board and then permanently attached thereto (e.g., by using an ultra violet ("UV") curable adhesive). Thus, embodiments provide a compact, low cost device and method for achieving a high density of optical connections around the perimeter of an optical printed circuit board.

Various embodiments of waveguide connector elements, optical assemblies and methods of optically coupling optical waveguides are described in detail below.

Figure 1:
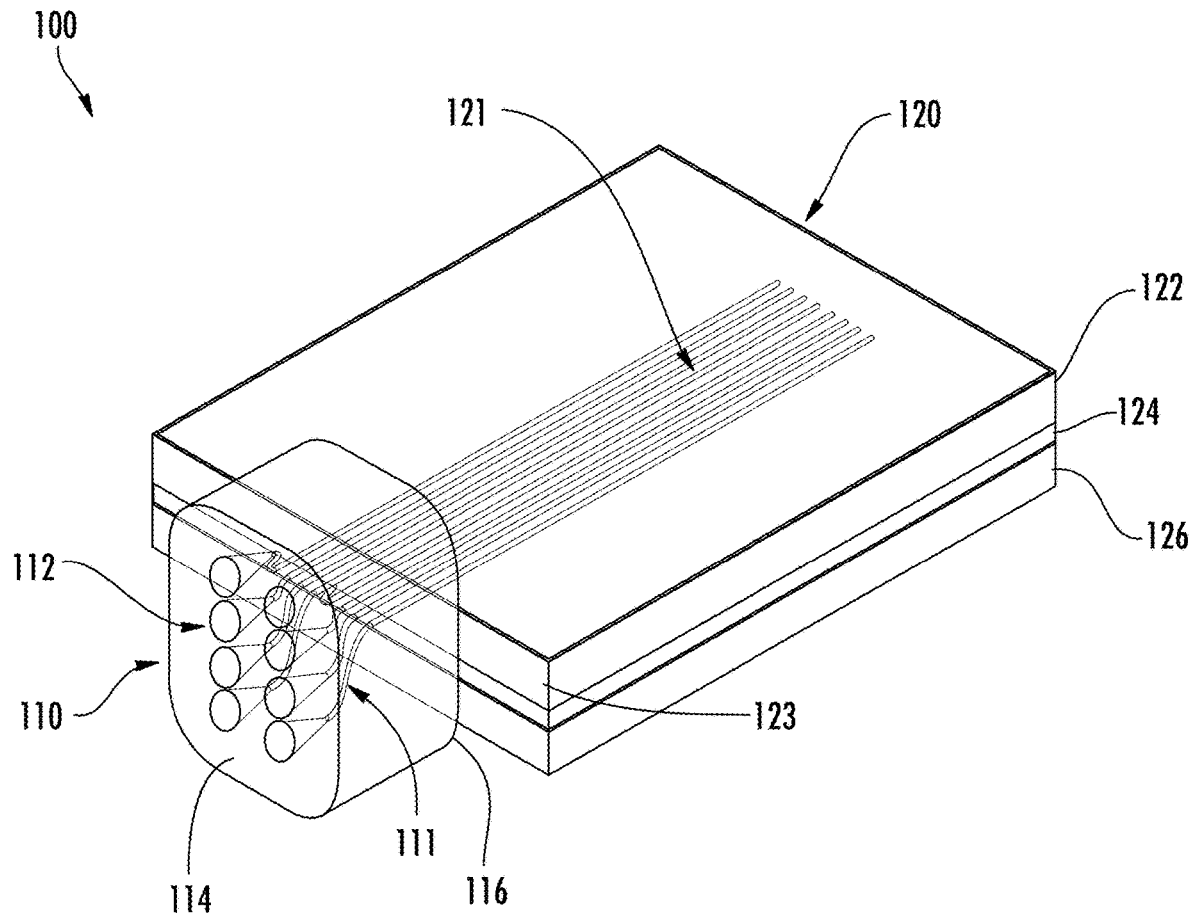
FIG. 1 schematically depicts a perspective view of an example optical assembly including a waveguide connector element optically coupled to an optical printed circuit board according to one or more embodiments described and illustrated herein.

Referring now to FIG. 1, an example optical assembly 100 comprising a waveguide connector element 110 coupled to an optical printed circuit board 120 is schematically illustrated. In the illustrated example, the optical printed circuit board 120 comprises an optical layer 124 disposed between first and second dielectric layers 122, 126. In some embodiments, the optical layer 124 is fabricated from glass, while the first and second dielectric layers 122, 126 are fabricated from a printed circuit board material, such as FR-4, for example.

As shown in FIG. 1, the optical layer 124 of the optical printed circuit board 120 includes a plurality of optical waveguides 121 operable to propagate optical signals therein. In general the board edge connector approaches described in this disclosure are independent of optical waveguide technology used to implement links within the optical printed circuit board 120. The plurality of optical waveguides 121 may be fabricated by any means, such as by a laser writing process or an ion exchange process that is operable to change the index of refraction to create the plurality of optical waveguides 121. Other optical waveguides may be utilized, such as, without limitation, planar glass dielectric waveguides, embedded optical fiber waveguides, and polymer waveguides.

The plurality of optical waveguides 121 extends to or from an edge 123 of the optical printed circuit board 120. The example waveguide connector element 110 is coupled to the edge 123 of the optical printed circuit board 120. The waveguide connector element 110 comprises a plurality of lens elements 112 optically coupled to a plurality of internal waveguides 111. As used herein, the term "optically coupled" means that optical signals are able to pass between two elements, such as between a lens and a waveguide, or between adjacent waveguides. The plurality of internal waveguides 111 of the waveguide connector element 110 is optically coupled to the plurality of optical waveguides 121 of the optical printed circuit board 120. In such a manner, optical signals are able to pass between the waveguide connector element 110 and the optical printed circuit board 120. It should be understood that additional optical and electrical components may be coupled to the optical printed circuit board 120, such as laser diodes, photodiodes, integrated circuits, electrical components, electrically conductive traces, and the like. Various embodiments of waveguide connector elements and optical printed circuit boards are described in detail below.

Figure 2A:
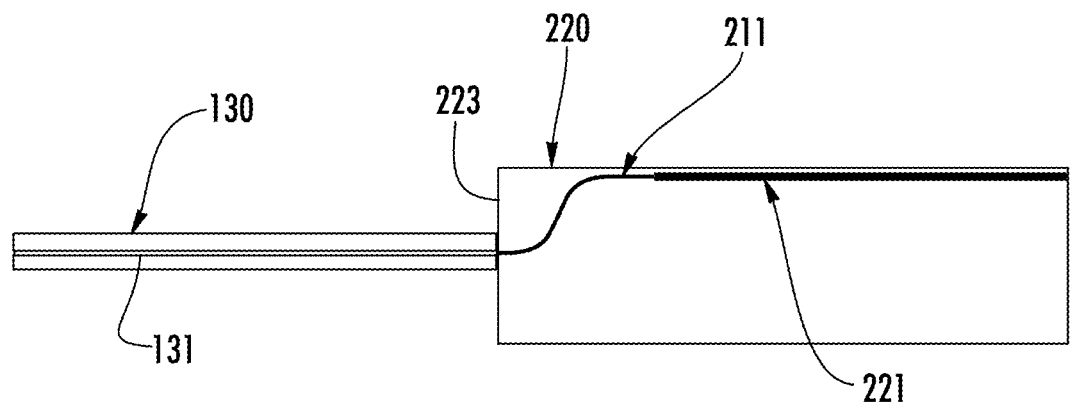
FIG. 2A schematically depicts a side view of an example optical assembly including at least one optical fiber optically coupled to an optical printed circuit board according to one or more embodiments described and illustrated herein.
Figure 2B:
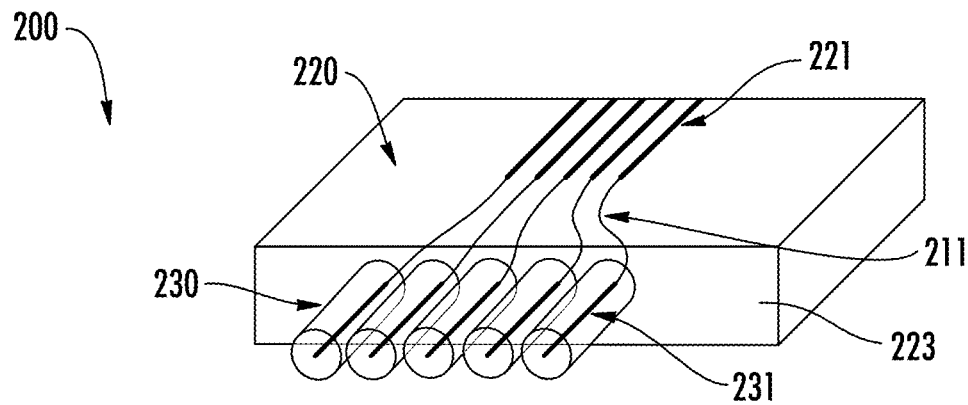
FIG. 2B schematically depicts a perspective view of the example optical assembly depicted in FIG. 2A according to one or more embodiments described and illustrated herein.

Referring now to FIGS. 2A and 2B, an example waveguide connector element 220 optically coupled to a plurality of optical fibers 230 is schematically illustrated. The waveguide connector element 220 may be fabricated from glass, for example. The example optical coupling device 220 comprises a first plurality of optical waveguides 221 optically coupled to a second plurality of optical waveguides 211. The first plurality of optical waveguides 221 may be pre-fabricated within and/or on the waveguide connector element 220 prior to writing or otherwise fabricating the second optical waveguides 211 and attaching the plurality of optical fibers 230. As such, the optical waveguides of the first plurality of optical waveguides 221 are pre-existing waveguides. As used herein, the term "pre-existing optical waveguides" means waveguides that are previously applied to the waveguide connector element prior to the fabrication of additional optical waveguides or beam expansion lenses. As an example and not a limitation, a "pre-existing optical waveguide" is an ion exchanged optical waveguide that changes the index of refraction of the glass material that is fabricated prior to laser writing a laser written optical waveguide or a laser written beam expansion lens as described in detail herein.

As described in more detail below, the second plurality of optical waveguides 211 may be written by a laser process such that the second plurality of optical waveguides 211 is precisely disposed between the first plurality of optical waveguides 221 and the optical cores 231 of the plurality of optical fibers 230.

As shown in FIG. 2A, the second plurality of optical waveguides 211 may be laser written to increase the depth of the second plurality of optical waveguides 211 into the bulk of the waveguide connector element 220. Further, FIG. 2B illustrates that the second plurality of optical waveguides 211 may be fabricated as fan-out optical waveguides such that second plurality of optical waveguides increase in pitch from the first plurality of optical waveguides 221.

Figure 3A:
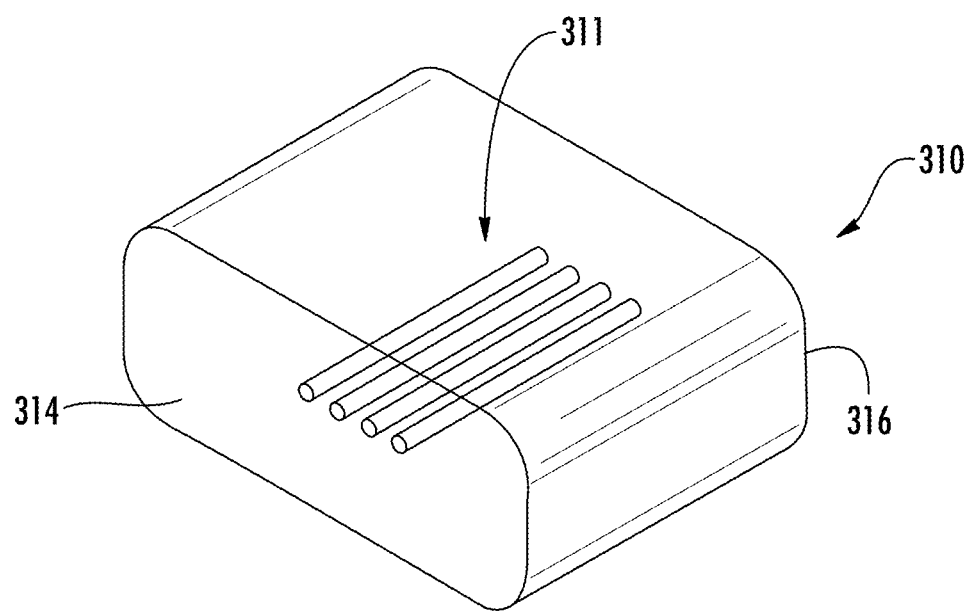
FIG. 3A schematically depicts a perspective view of an example glass drawn waveguide connector element with pre-formed optical waveguides according to one or more embodiments described and illustrated herein.
Figure 3B:
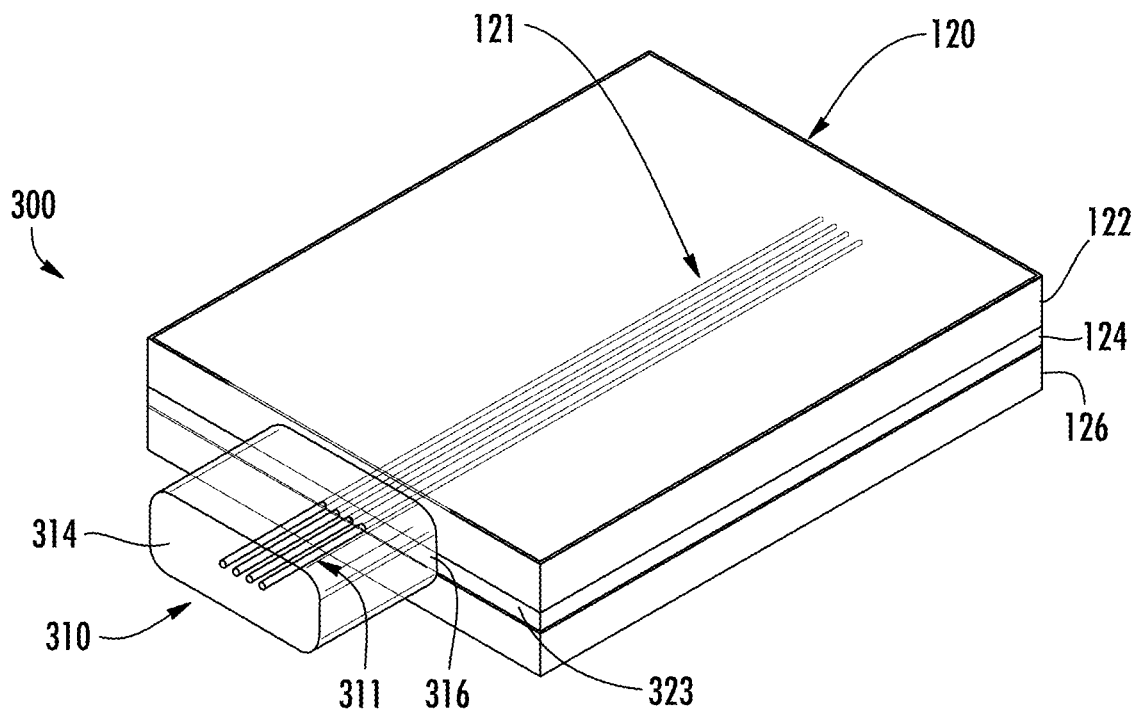
FIG. 3B schematically depicts a perspective view of an optical assembly including the ferrule connector depicted in FIG. 3A optically coupled to an optical printed circuit board according to one or more embodiments described and illustrated herein.
Figure 3C:
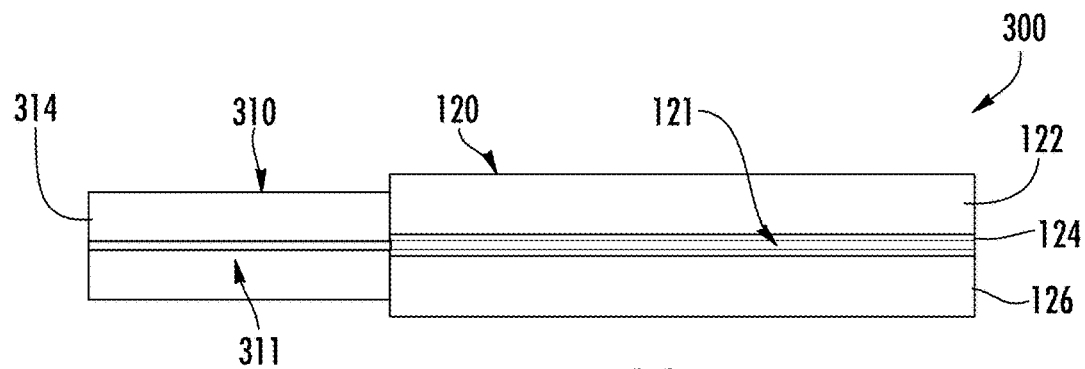
FIG. 3C schematically depicts a side view of the optical assembly depicted in FIG. 3B according to one or more embodiments described and illustrated herein.

FIG. 3A schematically illustrates an example waveguide connector element 310 having a plurality of optical waveguides 311 at a fixed pitch, thereby defining an optical assembly 300. FIG. 3B schematically illustrates the example waveguide connector element 310 coupled to an edge 323 of an example optical printed circuit board 320. FIG. 3C is a side view of the waveguide connector element 310 and the optical printed circuit board 320. The optical layer 124 comprises a plurality of optical waveguides 121 at the same fixed pitch as the plurality of optical waveguides 311 of the redrawn glass waveguide connector element 310 such that the two pluralities of optical waveguides are optically coupled to one another.

As stated above, the waveguide connector element 310 may be fabricated from glass materials. For example, glass sheet-based waveguide connector elements may be fabricated using precision fusion draw processes and rapidly patterned using laser cutting technologies. The redrawn glass waveguide connector element 310 can include waveguides that are either multimode or single-mode. Although the drawings of the present disclosure generally depict optical waveguides located at the midplane of the optical printed circuit board 320, the waveguide connector elements described herein are also applicable to applications where waveguides are at or near the top or bottom surfaces of the optical printed circuit board.

Figure 3D:
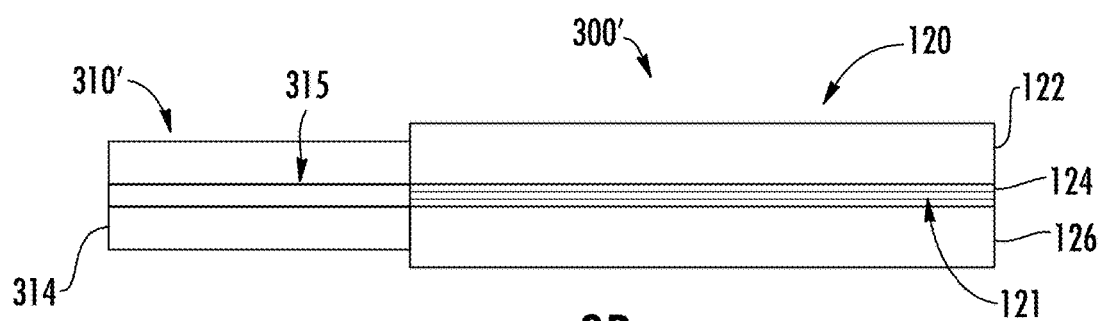
FIG. 3D schematically depicts a side view of an example optical assembly including a waveguide connector element having a plurality of gradient-index lenses (GRIN) optically coupled to an optical printed circuit board according to one or more embodiments described and illustrated herein.

By selecting a suitable profile of the refractive index of the waveguide connector element 310, an array of graded index (GRIN) lenses can also be fabricated within the waveguide connector element 310 to provide an "expanded-beam" interconnection that reduce sensitivity to lateral misalignments and interface debris in coupling. FIG. 3D depicts an optical assembly 300' comprising a waveguide connector element 310' having GRIN lenses 315 as optical waveguides. In order to provide a collimate beam at the interface, the GRIN lens should have a specific length, which depends on its refractive index profile. A known example is a parabolic profile given by $$n(r) = n_1\left[1 - \frac{A}{2}r^2\right]$$

where n(r) is the refractive index, r, is the radial distance from the center of the lens, $n_1$ is the index at the center of the lens, and A is a constant. For such a profile, the length of the lens to obtain a collimated beam is approximately equal to $$\left(\frac{k}{2} + \frac{1}{4}\right)P$$

where $$P = \frac{2\pi}{\sqrt{A}}$$

and k is an integer number>=0.

Prior to waveguide connector element 310 attachment to the edge 323 of the optical printed circuit board 320, the end faces 314, 316 should be cut (preferably at an angle to reduce back reflections) and polished to length. The end faces 314, 316 may also be precision polished so that a large radius curve is formed, where the radiused curve may be formed with its axis parallel to the plane of the optical printed circuit board 320, as described in more detail below.

In one embodiment, the redrawn glass waveguide connector element 310 may be actively or passively aligned to the plurality of optical waveguides 121 that are embedded in the optical printed circuit board 120 and then attached. Because the waveguide connector element 310 is completely UV-transparent, it enables use of UV curable adhesive for attachment to photonic integrated circuits, particularly in small cavities and narrow gaps, such as regions between optical printed circuit boards and photonic integrated chips. This approach provides a compact, low cost method for achieving a high density of optical connections around the perimeter of an optical printed circuit board.

Figure 4:
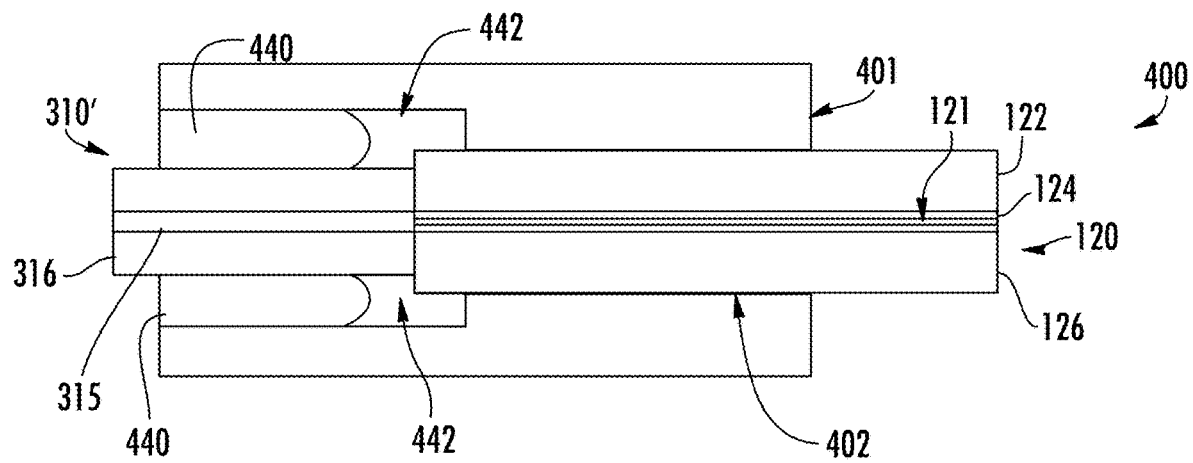
FIG. 4 schematically depicts a side view of an example optical assembly including a waveguide connector element optically coupled to an optical printed circuit board disposed within a connector housing according to one or more embodiments described and illustrated herein.

Referring to FIG. 4, the waveguide connector element 310' may be stabilized and protected after optical printed circuit board edge attachment using additional adhesive and one or more connector housings 401. FIG. 4 schematically illustrates an optical assembly 400 comprising a waveguide connector element 310', an optical printed circuit board 120, and a connector housing 401. The connector housing 401 may be molded from a polymer, for example. In the illustrated embodiment, the connector housing 401 includes a recess 402 into which the optical printed circuit board 120 and the waveguide connector element 310' is disposed. In the illustrated embodiment, one or more inserts 440 are disposed in the recess 402 between the waveguide connector element 310' and the connector housing 401. Both the optical printed circuit board 120 and the waveguide connector element 310' may be secured within the connector housing 401 by an adhesive 442, such as a UV curable adhesive. The connector housing also provides coarse alignment between an external optical fiber array connector and the optical printed circuit board edge connector.

Figure 5:
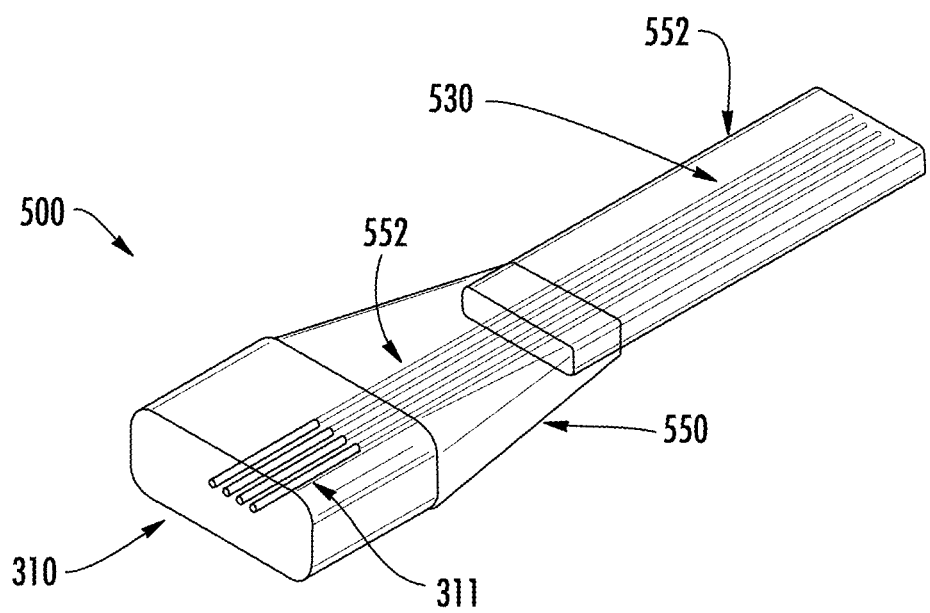
FIG. 5 schematically depicts a perspective view of an example optical fiber connector assembly including a waveguide connector element coupled to optical fibers of an optical cable according to one or more embodiments described and illustrated herein.

FIG. 5 schematically depicts an example optical fiber connector assembly 500 comprising a plurality of optical fibers 530 optically coupled to an end face 314 of the waveguide connector element 310 depicted in FIG. 3A. The ribbonized optical fibers 530 are disposed within a jacket or other external component 552. The ribbonized optical fiber array can be stripped and cleaned, so that individual optical fibers 530 may be placed in a precision V-groove block (not shown), either permanently or as a temporarily alignment jig for assembly. Next the ends of the optical fibers 530 are actively aligned and attached to the end face 314 of the waveguide connector element 310 using an adhesive 550, for example.

After optical fiber alignment, the optical fiber connector assembly 500 would require supplemental mechanical reinforcement provided by a connector housing, such as illustrated in FIG. 4, for example. Additional strain relief may be provided by adhesive potting to firmly attach individual fibers in the optical fiber array to the connector housing. A boot (not shown) provided as a discrete component or formed by covering a portion of the fiber array with an elastomeric adhesive may also be utilized required to prevent excessive fiber ribbon side pulls during connector assembly and use.

In general, embodiments of the glass waveguide connector elements described in the present disclosure are depicted in a configuration where they provide board edge interconnections to optical printed circuit board waveguides. However, it should be understood that the same waveguide connector elements designs may be applied to optical fiber ribbon connectors as shown in FIG. 5.

Alignment tolerances between mated connector optical waveguides are generally tightest in the lateral direction (i.e., perpendicular to the axis of the waveguide). For single-mode optical waveguides, the lateral alignment tolerance is typically about 0.5 µm, while for multimode optical waveguides this tolerance is larger (e.g., about 3-5 µm). The diameter of the optical waveguide may be gradually enlarged via a taper structure as it approaches the end face.

Figure 6A:
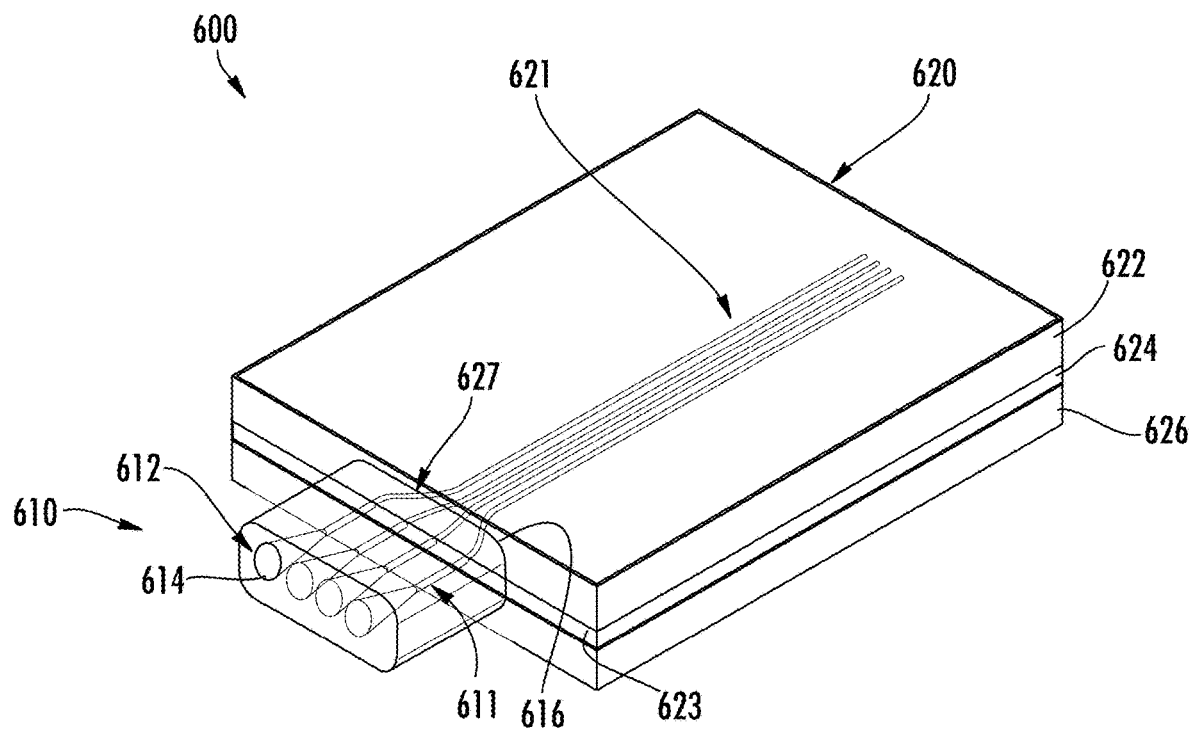
FIG. 6A schematically depicts a perspective view of an example optical assembly including a waveguide connector element having expanded beam lenses formed by a tapered structure optically coupled to an optical printed circuit board according to one or more embodiments described and illustrated herein.

FIG. 6A schematically illustrates an example optical assembly 600 comprising a waveguide connector element 610 and an optical printed circuit board 620. The optical printed circuit board 620 comprises an optical layer 624 disposed between to dielectric layers 622, 626. The optical layer comprises a plurality of optical waveguides 621 that fan out at 627 proximate an edge 623 of the optical printed circuit board 620. The waveguide connector element 610 includes a plurality of pre-existing optical waveguides 611 optically coupled to a plurality of beam expansion lenses 612 formed by tapered waveguides. The plurality of pre-existing optical waveguides 611 of the waveguide connector element 610 is optically coupled to the plurality of optical waveguides 621 of the optical layer 624. The plurality of pre-existing optical waveguides 611 may be configured as ion exchanged optical waveguides, for example.

The enlarged taper structure of the beam expansion lenses 612 results in a mode field diameter that is about 15-80 µm in diameter, which is about two time to about ten times the size of a standard SMF-28 fiber guided mode at the end face 614 of the waveguide connector element 610. If the taper changes gradually (i.e., adiabatically), light is not coupled between modes, so that light launched into the fundamental mode at one end of the waveguide connector element 610 remains in the fundamental mode of the waveguide at the other end 616.

The larger diameter tapers enable coupled waveguide lateral alignment tolerances to be relaxed to larger values (e.g., 1-5 µm). These larger lateral alignment tolerances allow waveguide connector elements to be fabricated with more variation in outside surface shape, while connector components can be assembled using less precise techniques that are less expensive. While joined connectors are more sensitive to angular misalignment, the ferrule-in-sleeve configuration may maintain tight angle control.

Waveguide guided modes may also be expanded at the end face using lenses that are located at the surface or interior of the glass substrate. Lens fabrication generally requires the ability to create high index of refraction regions within the glass substrate and graded index cores that are effective in changing the direction of light propagation to enable beam collimation and focusing. Not all processes are capable of creating the large local index of refraction changes required to make effective lenses. Although waveguide taper is shown in the appended drawings, because the exact index of refraction profiles are not shown, similar structures could also contribute a lensing function, and they are generally labeled and described as lenses herein. It should be understood that if the taper is sufficiently long it can produce a large diameter mode field similar to what could be expected from a lens.

In the example depicted by FIG. 6A, the beam expansion lenses 612 are fabricated in axial alignment with the pre-existing optical waveguides 611. Lenses should also be created on precise array pitch to minimize beam steering error. The process of attaching the waveguide connector element 610 to the edge 623 of the optical printed circuit board 620 may require precise lateral alignment between the pre-existing optical waveguides 611 of the waveguide connector element 610 and optical waveguides 621 of the optical printed circuit board 620. In embodiments, the exterior of the waveguide connector element 610 may be treated for durability via a chemical strengthening process, such as ion exchange processes.

Figure 6B:
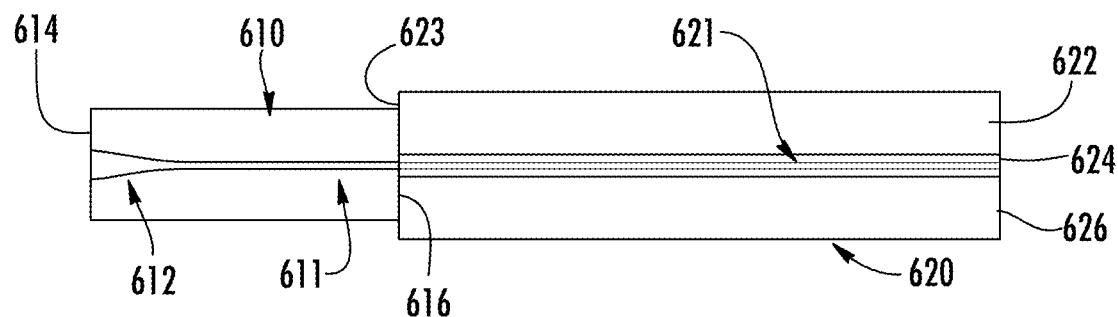
FIGS. 6B-6D schematically depict side views of three waveguide connector elements having different expanded beam lens configurations optically coupled to an optical printed board according to one or more embodiments described and illustrated herein.
Figure 6C:
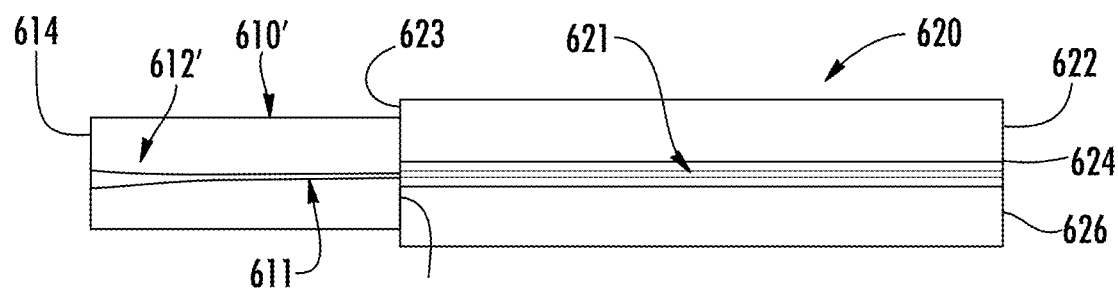
Figure 6D:
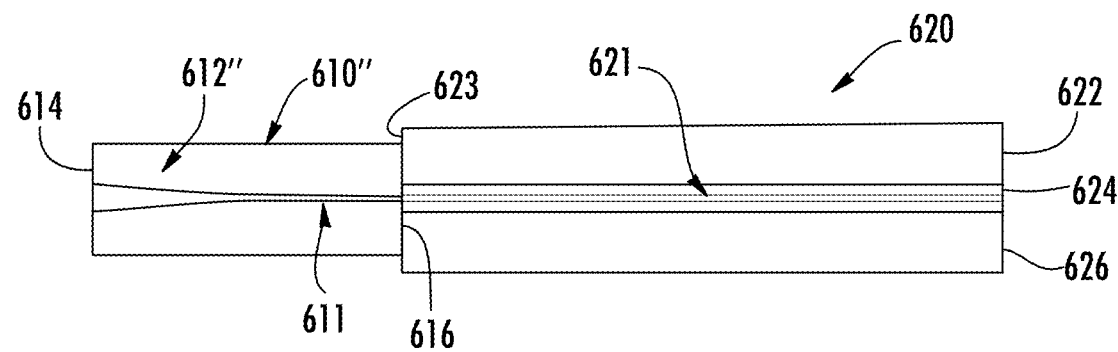

FIGS. 6B-6D depict various configurations of beam expanding lenses 612 of a waveguide connector element 610. FIG. 6B depicts an embodiment wherein the beam expansion lenses 612 defining the waveguide taper lens structure formed using ion exchange after cutting the end face 614 of the waveguide connector element 610. FIG. 6C depicts a waveguide connector element 610' wherein the beam expansion lenses 612' are formed by thermal expansion of the core of the glass waveguide connector element 610. FIG. 6D depicts a waveguide connector element 610" wherein the beam expansion lenses 612" are formed by pulsed laser writing (e.g., by a femtosecond pulsed laser).

Figure 7A:
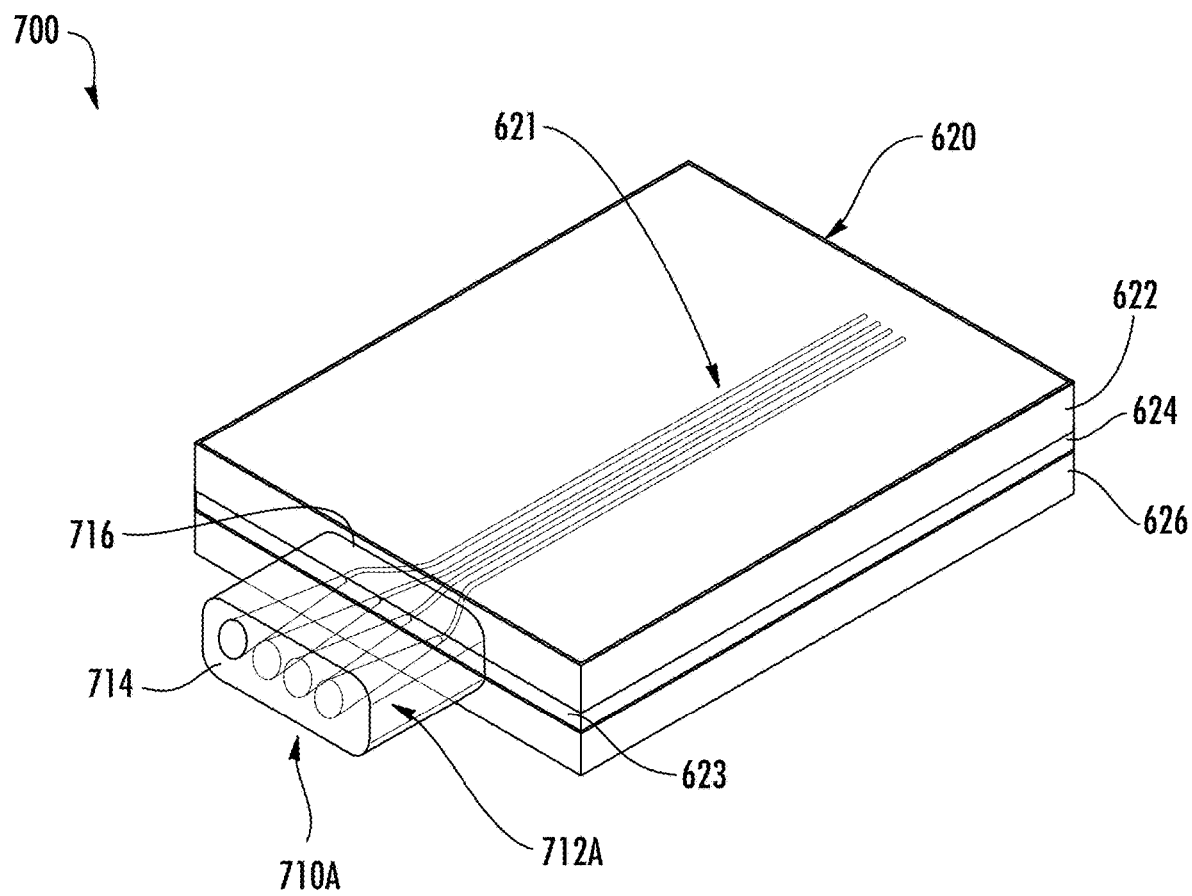
FIG. 7A schematically depicts a perspective view of an example optical assembly including a waveguide connector element including expanded beam lenses having a tapered structure optically coupled to an optical printed circuit board according to one or more embodiments described and illustrated herein.

In some embodiments, the waveguide connector element does not include internal optical waveguides. FIG. 7A depicts an optical assembly 700 comprising a waveguide connector element 710A coupled to an edge 623 of an optical printed circuit board 620. The waveguide connector element 710A includes lenses 712A but does not include additional internal optical waveguides. Rather, the lenses 712A are directly coupled to the optical waveguides 621 of the optical printed circuit board 620 at the end face 716 of the waveguide connector element 710A.

Not including the internal optical waveguides simplifies the waveguide connector element fabrication process, since maintaining precision alignment of the internal waveguide relative to the exterior surface of the waveguide connector element 710A is not required. As in the example depicted by FIG. 6A, the waveguide connector element 710A is first modified to create internal light guiding structures. Then, after qualification testing, the waveguide connector element 710A is precision aligned and attached the optical printed circuit board 620.

Figure 7B:
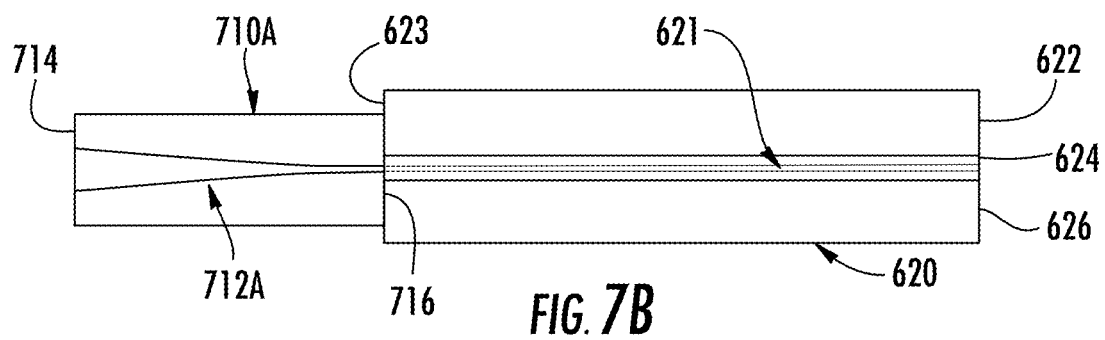
FIG. 7B schematically depicts a side view of an example optical assembly including a waveguide connector element including expanded beam lenses having a tapered structure extending a full length of the ferrule connector, wherein the waveguide connector element is optically coupled to an optical printed circuit board according to one or more embodiments described and illustrated herein.
Figure 7C:
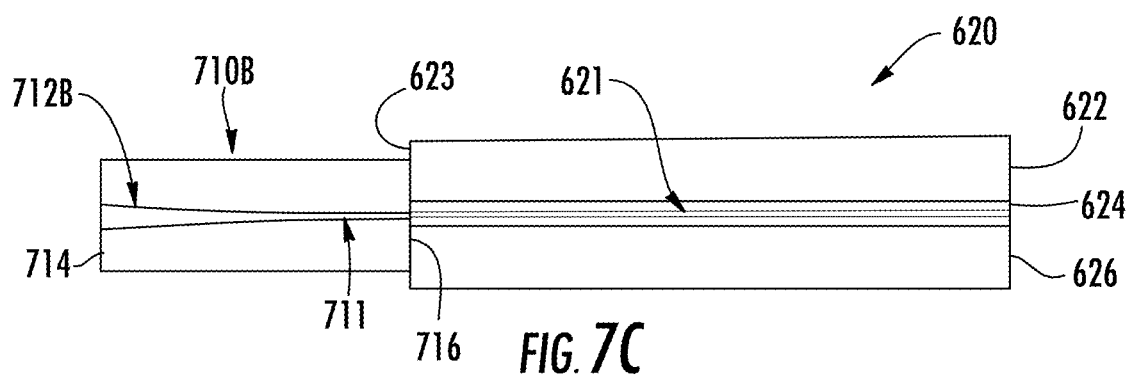
FIG. 7C schematically depicts a side view of an example optical assembly including a waveguide connector element including expanded beam lenses having a tapered structure optically coupled to laser written optical waveguides, wherein the waveguide connector element is optically coupled to an optical printed circuit board according to one or more embodiments described and illustrated herein.
Figure 7D:
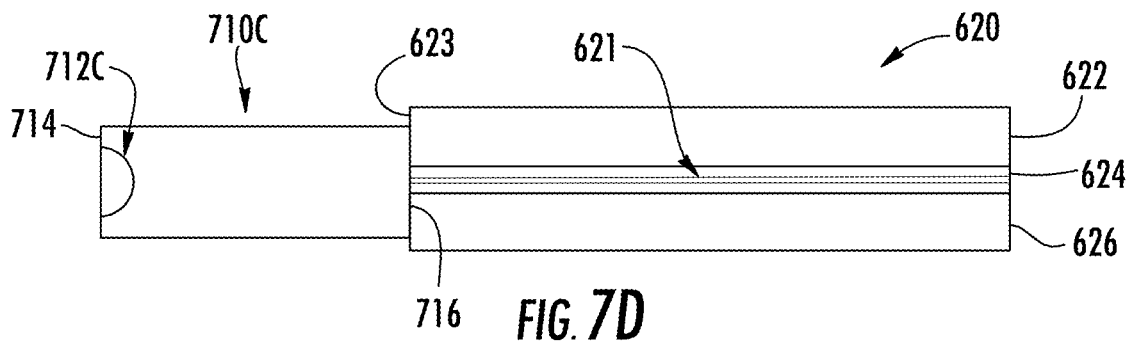
FIG. 7D schematically depicts a side view of an example optical assembly including a waveguide connector element including ion exchanged lenses, wherein the waveguide connector element is optically coupled to an optical printed circuit board according to one or more embodiments described and illustrated herein.

FIG. 7B schematically depicts the waveguide connector element 710A shown in FIG. 7A wherein the lenses 712A extend the entire length of the waveguide connector element 710 and are formed by a pulsed laser writing process. FIG. 7C depicts a waveguide connector element 710B wherein the lenses 712B are combined with optical waveguide sections 711 that are coaxially aligned during the laser writing fabrication process. FIG. 7D schematically depicts an example waveguide connector element 710C wherein the lenses 712C are formed by an ion exchanged process at the end face 714 of the waveguide connector element 710C.

Figure 7E:
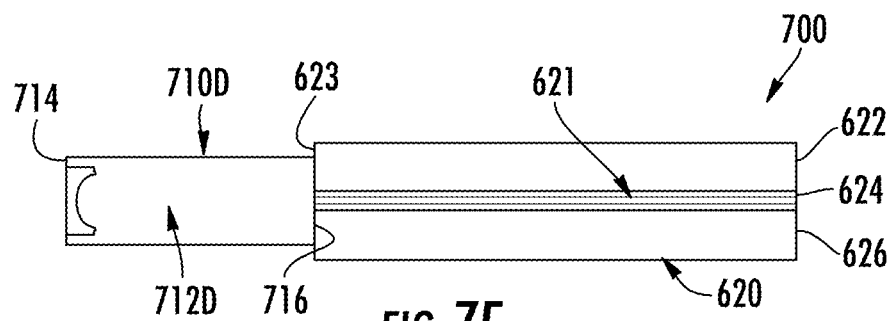
FIG. 7E schematically depicts a side view of an example optical assembly including a waveguide connector element including hot pressed lenses, wherein the waveguide connector element is optically coupled to an optical printed circuit board according to one or more embodiments described and illustrated herein.
Figure 7F:
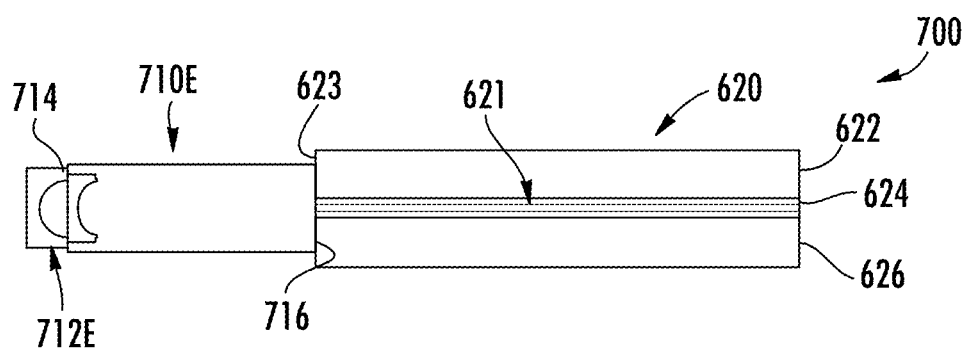
FIG. 7F schematically depicts a side view of an example optical assembly including a waveguide connector element including glass lenses, wherein the waveguide connector element is optically coupled to an optical printed circuit board according to one or more embodiments described and illustrated herein.
Figure 7G:
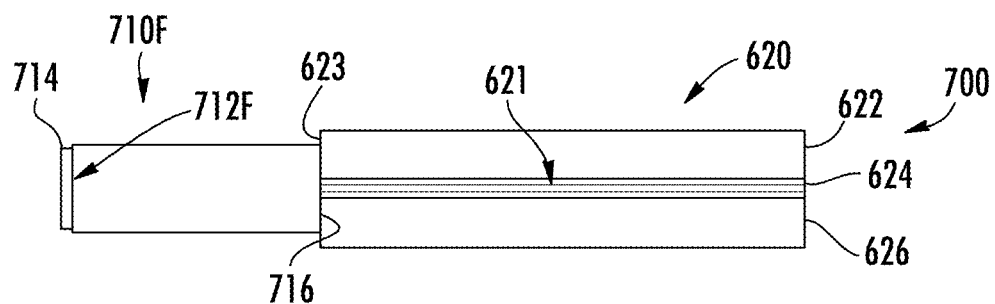
FIG. 7G schematically depicts a side view of an example optical assembly including a waveguide connector element including lenses at the end face, wherein the waveguide connector element is optically coupled to an optical printed circuit board according to one or more embodiments described and illustrated herein.

The lenses of the waveguide connector element may be fabricated by other processes. FIG. 7E schematically depicts an example waveguide connector element 710D wherein the lenses 712D are configured as pressed lenses that are hot pressed into the end face 714 of the waveguide connector element 710D. It is noted that the exterior dimensions of the waveguide connector element 710D should not be distorted during the pressing process. FIG. 7F schematically illustrates an example waveguide connector element 710E wherein the lenses are configured as glass lenses 712E that are added to the end face 714 of the waveguide connector element 710E. FIG. 7G schematically illustrates an example waveguide connector element 710F wherein the lenses 712F are configured as diffractive or binary optic lenses that are created using pressing or photographic processes.

One advantage of femtosecond pulse laser written optical waveguide technology is that it allows waveguides to be written at arbitrary locations and depths within glass bodies. Waveguide "pitch conversion" (i.e. a change in the spacing among the waveguides that comprise an array of waveguides) is a function for enabling waveguide arrays that are fabricated on two different pitches to be connected to each other. For example, single-mode waveguide pitches on photonic chips and optical printed circuit board can be 25-40 µm, while pitches commonly used for arrayed optical connectors are generally 127-250 µm. If mode field expanding tapers or lenses as described above are used at the end face, the optical waveguide pitch may need to be slightly larger.

Laser written optical waveguides may be created within glass substrates along gently curved paths to minimize optical bend losses. A computer controller laser written optical waveguide bench can create multiple precision optical paths through a waveguide connector element so that waveguides on one face of the waveguide connector element are on a fine pitch suitable for interfacing with waveguides from a photonic chip, optical printed circuit board, or fiber ribbon, while waveguides are on a larger pitch that is suitable for use in reliable low-loss optical connectors. After quality testing, the laser written optical waveguide connector element 610 can be aligned and attached to its mating waveguide device, such as the optical printed circuit board 620 shown in FIG. 6A.

Figure 8A:
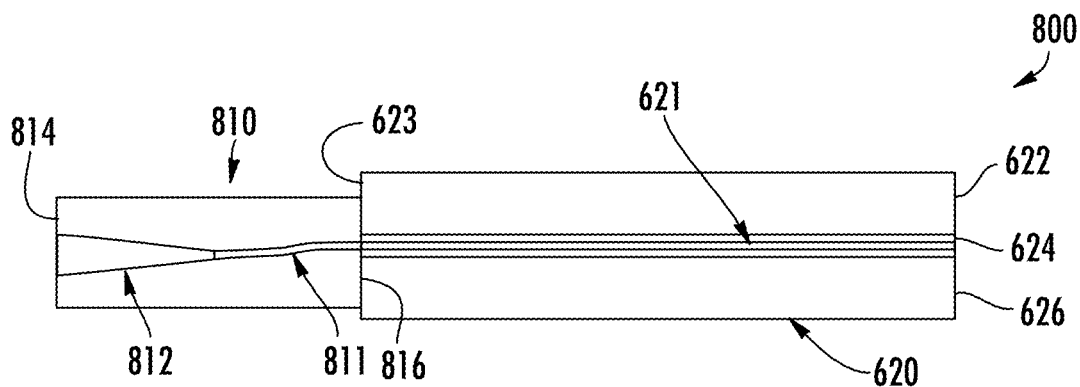
FIG. 8A schematically depicts a side view of an example optical assembly including a waveguide connector element including expanded beam lenses optically coupled to laser written optical waveguides, wherein the waveguide connector element is optically coupled to an optical printed circuit board according to one or more embodiments described and illustrated herein.

Because laser written optical waveguides can be formed at arbitrary locations with the waveguide connector element, they can also be used to accommodate in-plane and out-of-plane displacements between taper or lens locations on the connector face of the waveguide connector element and the optical printed circuit board waveguide locations. FIG. 8A schematically illustrates an optical assembly 800 wherein an end face 816 of a waveguide connector element 810 is coupled to an edge 623 of an optical printed circuit board 620. The waveguide connector element 810 includes laser written lenses 812 extending from an end face 814, and laser written optical waveguides 811 that optically couple the laser written lenses 812 to the optical waveguides 621 of the optical printed circuit board 620.

Figure 8B:
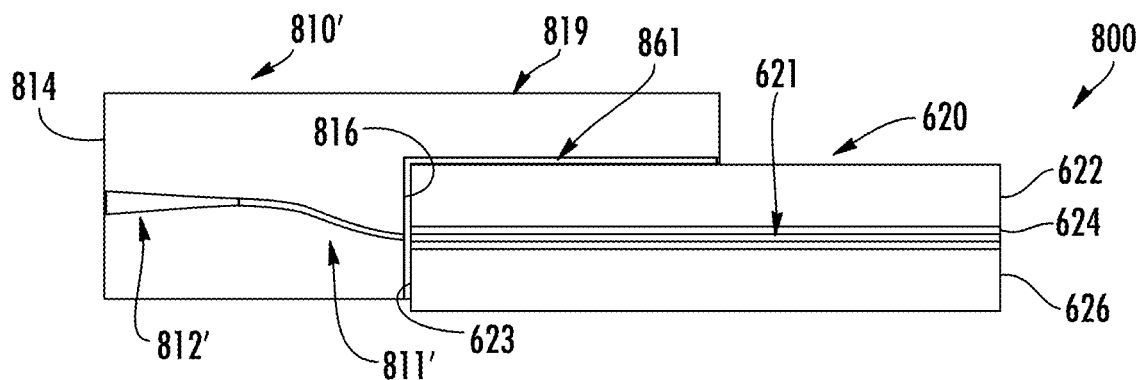
FIG. 8B schematically depicts a side view of an example optical assembly including a waveguide connector element including a step feature and expanded beam lenses optically coupled to laser written optical waveguides, wherein the waveguide connector element is optically coupled to an optical printed circuit board according to one or more embodiments described and illustrated herein.

Laser written optical waveguides can also be used to align to tapers and lenses created using other technologies (e.g., ion exchange lenses). FIG. 8B schematically illustrates a waveguide connector element 810' that includes ion exchange lenses 812' and laser written optical waveguides 811' that optically couple the ion exchange lenses 812' to the optical waveguides 621 of the optical printed circuit board 620. FIG. 8B further illustrates an alternative wherein the waveguide connector element 810' includes a step feature 819 that rests on a surface of the optical printed circuit board 620 to provide an increased mechanical bond area to the optical printed circuit board 620 using a UV-curable adhesive 861. It should be understood that waveguide connector elements having a step feature may also not include lenses.

Figure 8C:
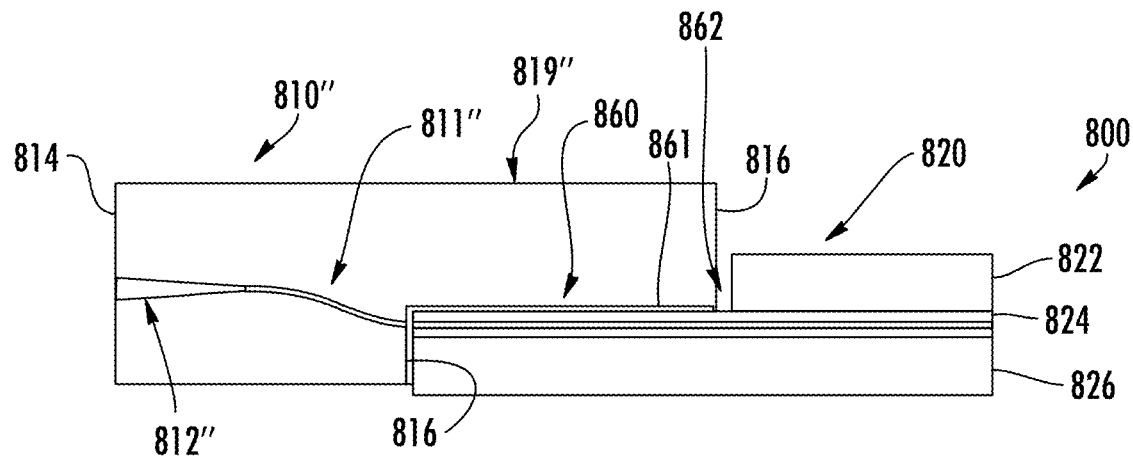
FIG. 8C schematically depicts a side view of an example optical assembly including a waveguide connector element including a step feature and expanded beam lenses optically coupled to laser written optical waveguides, wherein the waveguide connector element is optically coupled to an optical printed circuit board having a cutout according to one or more embodiments described and illustrated herein.

FIG. 8C illustrates an example wherein a waveguide connector element 810" has a step feature 819", and laser written optical waveguides 811" that optically couple laser written lenses 812" to optical waveguides 821 of an optical printed circuit board 820. The example optical printed circuit board 820 includes an optical layer 824 disposed between first and second dielectric layers 822, 826. In the illustrated embodiment, the optical printed circuit board 820 includes a cutout through the first dielectric layer 822 such that the optical layer 824 is exposed. The step feature 819" is adhered directly to the optical layer 824 by an adhesive 861 in the illustrated embodiment. It should be understood that the waveguide connector elements with a step feature and an optical printed circuit board may also not lenses.

Figure 9:
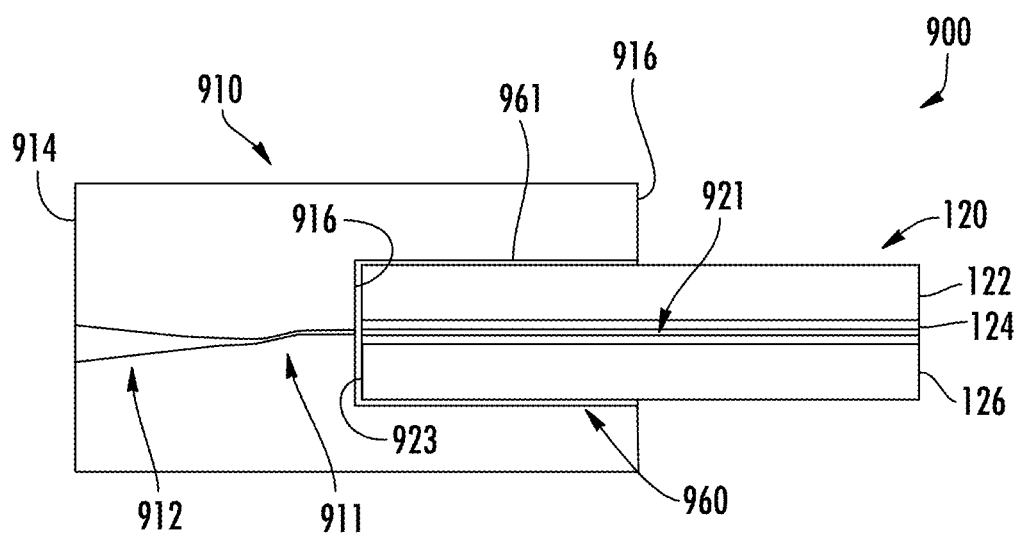
FIG. 9 schematically depicts a side view of an example optical assembly including a waveguide connector element including a notch and expanded beam lenses optically coupled to laser written optical waveguides, wherein the waveguide connector element is optically coupled to an optical printed circuit board according to one or more embodiments described and illustrated herein.

FIG. 9 schematically illustrates an example optical assembly 900 wherein the waveguide connector element 910 includes a notch 960 that is configured to receive an optical printed circuit board 120. In the illustrated embodiment, the optical printed circuit board 120 is secured within the notch 960 by a UV-curable adhesive. Laser written optical waveguides 911 optically couple lenses 912 to optical waveguides 121 of the optical printed circuit board 120.

In embodiments described herein, internal waveguides may be formed after partial assembly of parts, such as the waveguide connector element, into larger components. The ability to create waveguides in situ without any additional processing (e.g., wet chemistry waveguide development or etching) may be advantageous. In the proposed assembly process, a waveguide connector element is attached to the optical printed circuit board prior to completion of all internal waveguides via laser writing processes. For example, a laser written taper structure can be formed on the waveguide connector element end face using any of the processes described above without creating the complete waveguide that would eventually connect with optical printed circuit board waveguides. Only coarse alignment of the waveguide connector element to the optical printed circuit board waveguide locations is needed, which reduces assembly cost.

After optical printed circuit board attachment, the precise locations of optical printed circuit board waveguide ends relative to the end face of the waveguide connector element are determined. For example, optical printed circuit boards may be back illuminated so that their locations may be viewed using a microscope or digital imaging system. The interface between the waveguide connector element and the optical printed circuit board may be angled to simplify waveguide end imaging. Optical imaging may also be used to precisely determine the location of waveguide ends, tapers, and lenses within the waveguide connector element.

Once all waveguide end locations are known, multiple waveguide paths are laser written to link optical printed circuit board waveguides to target locations on the end face of the waveguide connector element. This is generally a rapid process, as laser written optical waveguides can be created at write speeds of up to 10 mm/sec. Even if multiple passes are required to create the laser written optical waveguide link, the small size of the waveguide connector element ensures that waveguides can be created in a matter of seconds.

It is noted that the embodiment shown in FIG. 8C above, in which the printed circuit board material has a cutout 860 and the waveguide connector element 810" is attached directly to the glass optical layer 824, is advantageous for the purpose of laser-writing the waveguides 811 after the waveguide connector element 810" has been attached to the optical printed circuit board 120. Namely, in the embodiment illustrated in FIG. 8B, the opaque printed circuit board material may partially block the laser beam that writes the waveguide (such beam is typically a convergent beam with high NA). The design of the embodiment illustrated in FIG. 8 C mitigates this problem By writing linking waveguides after waveguide connector element attachment to the optical printed circuit board, the process avoids problems with joint shift during UV curing that could lead to unacceptable link insertion losses. This is expected to boost yield and make the glass ferrule-to-optical printed circuit board attachment and laser written optical waveguide fabrication process suitable for implementation in large numbers late in the optical printed circuit board assembly process. This may be desirable for large optical printed circuit boards that are populated with a large number of photonic chips that consequently require many optical connectors around the perimeter of the optical printed circuit board. If the waveguide connector element joining and laser waveguide fabrication process is not an extremely high yield process yields on assembled optical printed circuit boards is expected to be unacceptably low.

Figure 10:
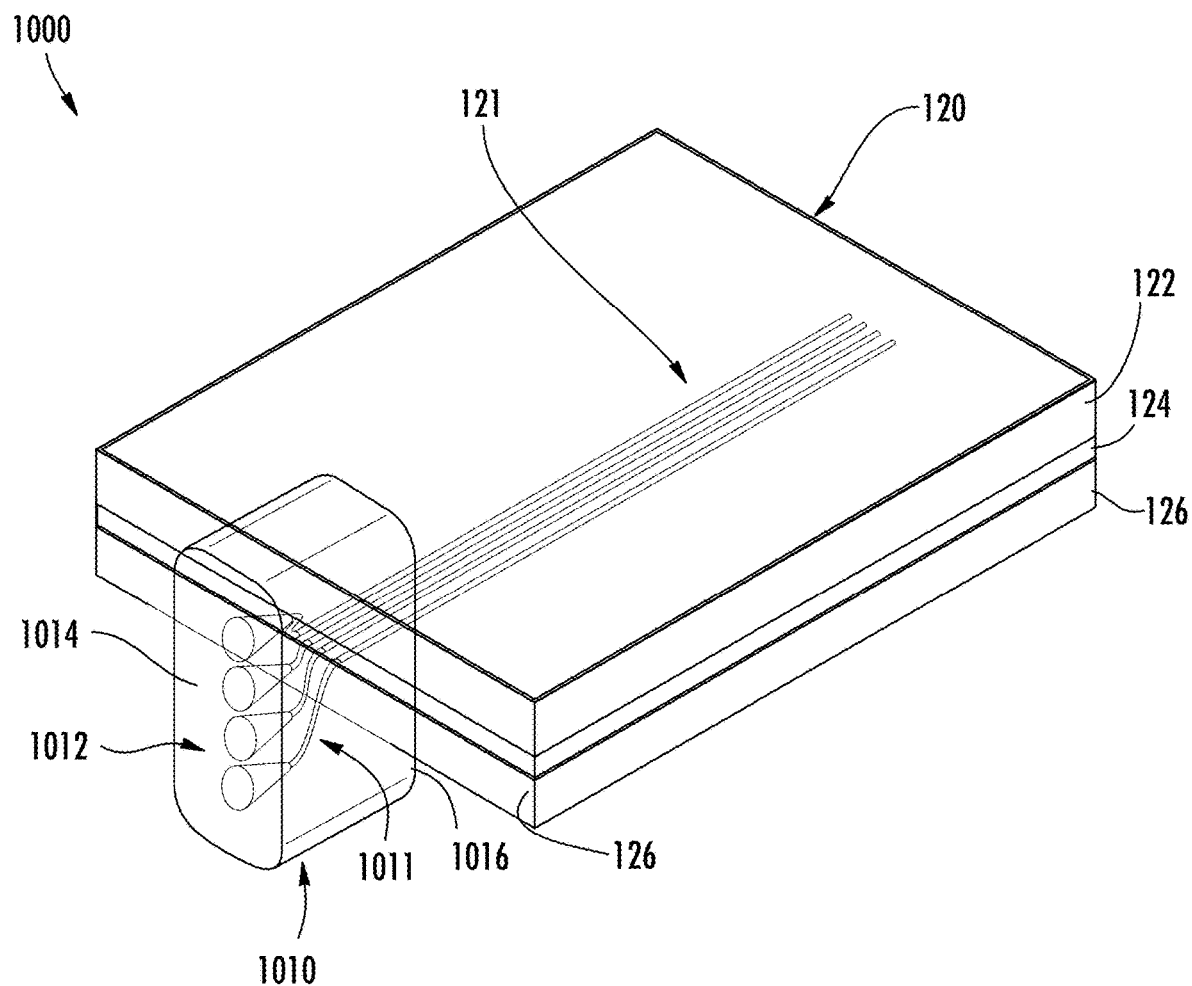
FIG. 10 schematically depicts a perspective view of an example optical assembly including a vertically arranged waveguide connector element having a one dimensional array of expanded beam lenses optically coupled to an optical printed circuit board according to one or more embodiments described and illustrated herein.

Providing large numbers of optical links to photonic chips on optical printed circuit boards may be challenging because each optical printed circuit board only provides a limited length around its perimeter for mounting optical connectors. One way to increase the density of optical connectors around the optical printed circuit board perimeter is to rotate mounted waveguide connector elements by 90 degrees. FIG. 10 schematically illustrates an optical assembly 1000 wherein a waveguide connector element 1010 is coupled to an edge 123 of an optical printed circuit board 120 such that the lenses 1012 are orthogonal to a plane defined by the optical printed circuit board 120. In this configuration, the optical link locations at the end face 1016 of the waveguide connector element 10010 may be arranged vertically instead of horizontally. Laser written optical waveguides 1011 may be formed before or after attachment to optical printed circuit board 120. If after attachment, precise printed circuit board waveguide positioning is not required, thereby reducing overall cost for the embedded fiber approach.

Figure 11:
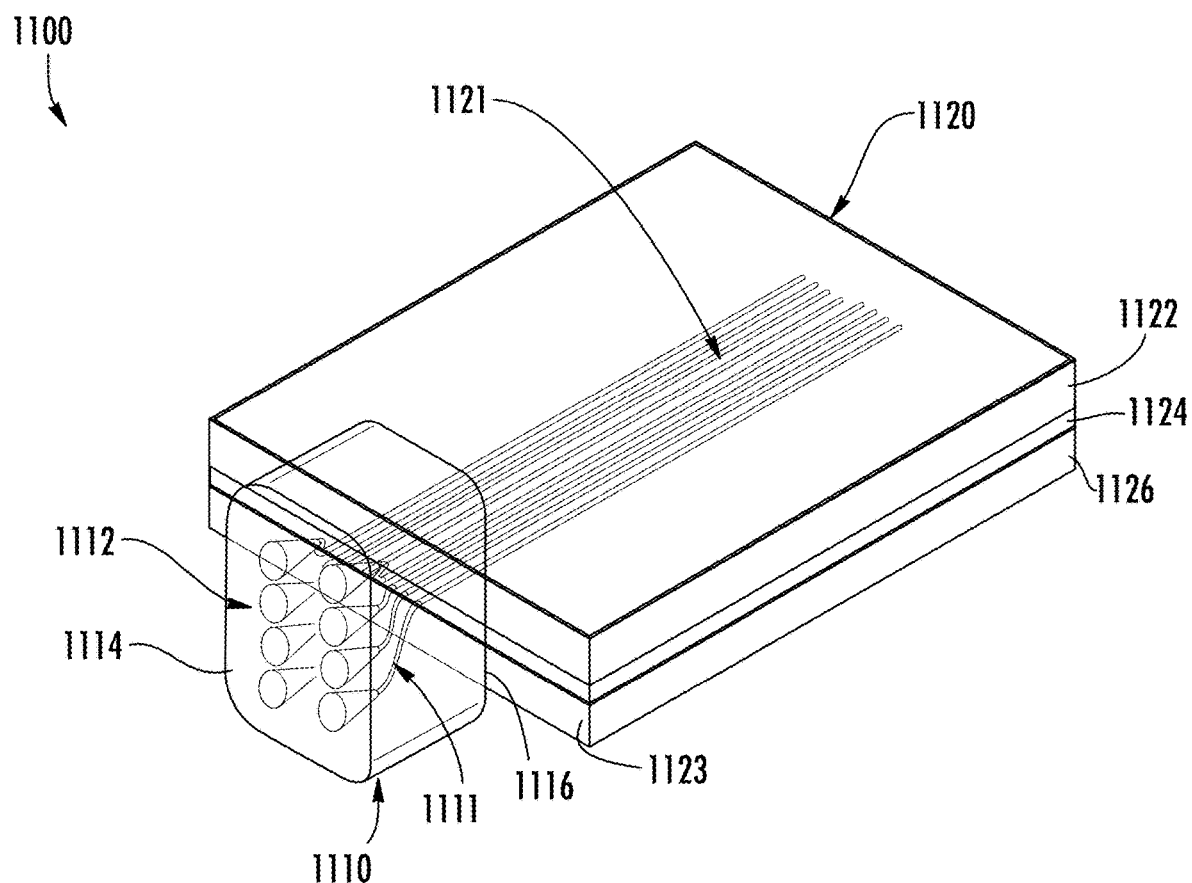
FIG. 11 schematically depicts a perspective view of an example optical assembly including a vertically arranged waveguide connector element having a two dimensional array of expanded beam lenses optically coupled to an optical printed circuit board according to one or more embodiments described and illustrated herein.

Laser written optical waveguides in waveguide connector elements (e.g., drawn glass ferrules) may be used to convert a one dimensional array of printed circuit board waveguides into a two dimensional array for compact connector interconnections as shown in the example optical assembly 1100 of FIG. 11. The optical printed circuit board 1120 includes a one dimensional array of optical waveguides 1121 in an optical layer 1124 disposed between two dielectric layers 1122, 1126. The waveguide connector element 1110 coupled to the edge 1123 of the optical printed circuit board 1120 comprises a two dimensional array of lenses 1112 extending from an end face 1114. A plurality of laser written optical waveguides 1111 optically couple the two dimensional array of lenses 1112 to the one dimensional array of optical waveguides of the optical printed circuit board 1120. In general, to increase connector density, the expanded beam diameter of the lenses 1112 and the pitch should not be large.

Figure 12:
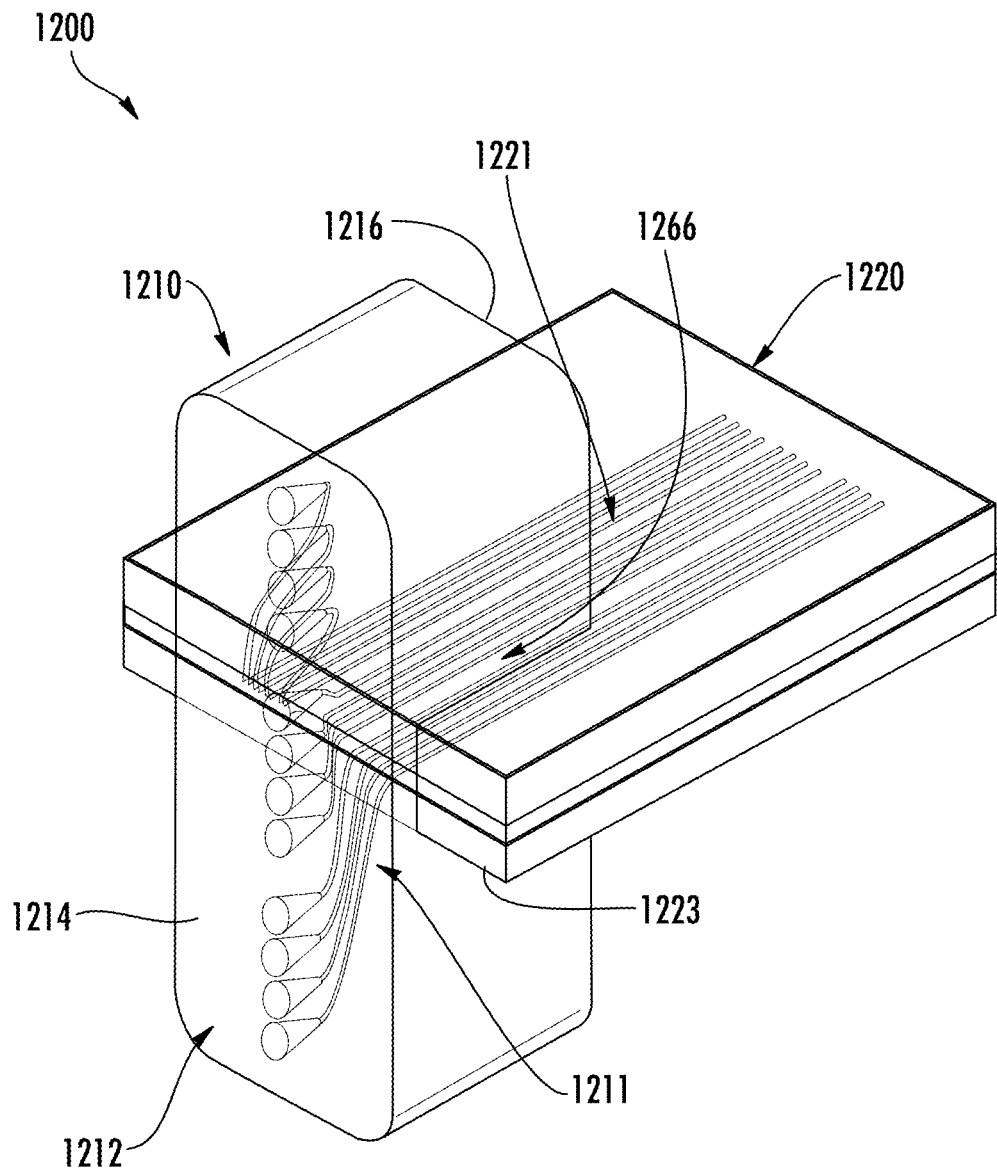
FIG. 12 schematically depicts a perspective view of an example optical assembly including a vertically arranged waveguide connector element having a one dimensional array of expanded beam lenses optically coupled to an optical printed circuit board, wherein the waveguide connector element above and below a plane defined by the optical printed circuit board, according to one or more embodiments described and illustrated herein.

Referring to FIG. 12, extending the approach for increased connector density along the optical printed circuit board edge 1223, the waveguide connector element 1210 may be elongated so that expanded beam lenses 1212 are distributed perpendicular to the optical printed circuit board 1220 plane. The waveguide connector element 1210 includes a notch 1260 operable to receive the optical printed circuit board 1220. The waveguide connector element 1210 may be made long enough above and/or below the optical printed circuit board 1220 to match the height of common optical printed circuit board-mounted components for improved optical printed circuit board edge area utilization. For example, the waveguide connector element 1210 may be designed to primary extend above the optical printed circuit board to a height similar surrounding quad small form-factor pluggable ("QSFP") optical transceiver modules. The waveguide connector element 1210 may also be designed to only extend below the optical printed circuit board by a minimal amount required to ensure adequate mechanical anchoring of the waveguide connector element 1210 to the optical printed circuit board 1220.

Figure 13:
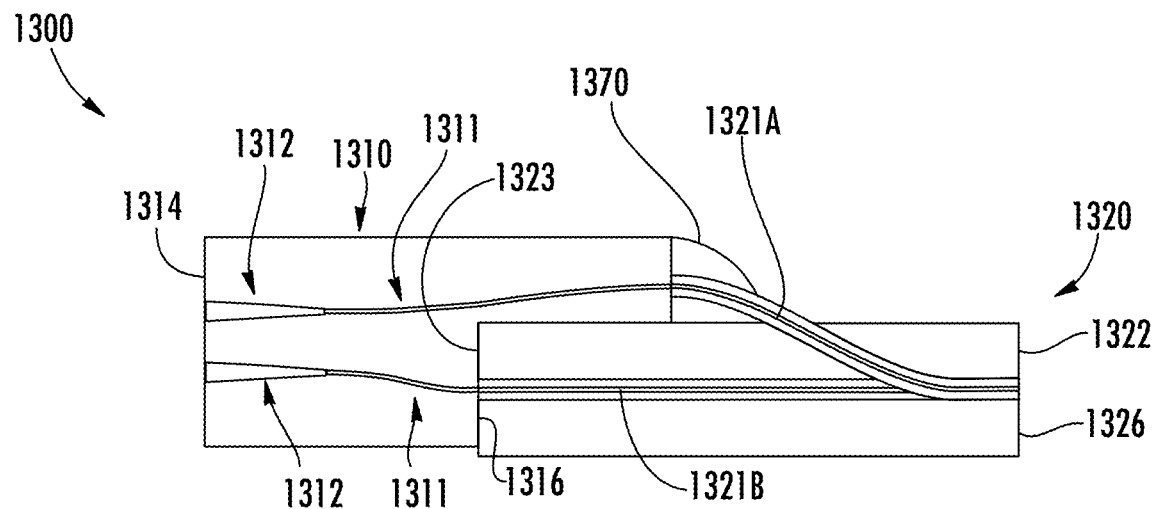
FIG. 13 schematically depicts a side view of an example optical assembly including a waveguide connector element having a step feature and a two dimensional array of expanded beam lenses and laser written optical waveguides optically coupled to an optical printed circuit board, wherein the optical printed circuit board includes a plurality of flexible optical waveguides according to one or more embodiments described and illustrated herein.

Because laser written optical waveguide bend radii may be limited for a compact ferrule design, two dimensional waveguide arrays can also be created by selectively deflecting more strongly guiding optical printed circuit board waveguides on flexible laser cut or sawed cantilevers out-of-plane to meet locations on the waveguide connector element. FIG. 13 illustrates an embodiment wherein the waveguide connector element 1310 comprises a first end face 1314, a second end face 1316 coupled to an edge 1323 of an optical printed circuit board 1320, a step feature 1319 coupled to a surface of the optical printed circuit board 1320, two rows of beam expanding lenses 1312, and a plurality of laser written optical waveguides 1311.

The optical printed circuit board comprises flexible optical printed circuit board waveguides 1321A (e.g., within a flexible optical layer) that are deflected above the plane defined by the optical printed circuit board 1320 in addition to optical printed circuit board waveguides 1321B. The optical printed circuit board 1320 further includes first and second dielectric layers 1322, 1326. As shown in FIG. 13, the flexible optical printed circuit board waveguides 1321A are deflected toward the step feature 1319, which may be secured by an adhesive 1370. Laser written optical waveguides 1311 may be written from the beam expanding lenses 1312 to the optical printed circuit board waveguides 1321A, 1321B.

Figure 14:
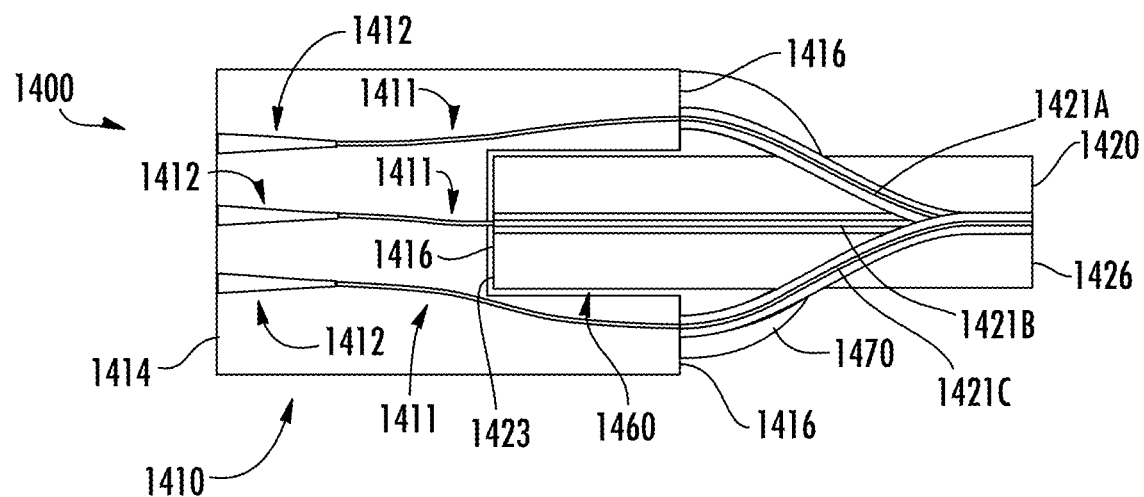
FIG. 14 schematically depicts a side view of an example optical assembly including a waveguide connector element having a notch and a two dimensional array of expanded beam lenses and laser written optical waveguides optically coupled to an optical printed circuit board, wherein the optical printed circuit board is disposed within the notch and includes a plurality of flexible optical waveguides according to one or more embodiments described and illustrated herein.

In the example optical assembly 1400 schematically illustrated in FIG. 14, the waveguide connector element 1410 comprises a notch 1460 configured to receive the optical printed circuit board 1420. The waveguide connector element 1410 further comprises three rows of beam expanding lenses 1412 extending from an end face 1414, and laser written optical waveguides 1411. An edge 1423 of the optical printed circuit board 1420 is disposed within the notch 1460 and is coupled to an end face 1416 of the waveguide connector element 1410 by a UV-curable adhesive. The optical printed circuit board 1420 further includes first flexible optical printed circuit board waveguides 1421A deflected above the plane of the optical printed circuit board 1420, second flexible optical printed circuit board waveguides 1421C deflected below the plane of the optical printed circuit board 1420, and optical printed circuit board waveguides 1421B centrally disposed between first and second dielectric layers 1422, 1426.

The first and second flexible optical printed circuit board waveguides 1421A, 1421C are deflected toward the waveguide connector element 1410 as shown in FIG. 14 and secured with a UV-curable adhesive. After adhesive curing, laser written optical waveguides 1411 may be created with the waveguide connector element 1410 that are aligned to the ends of the optical printed circuit waveguides.

Figure 15:
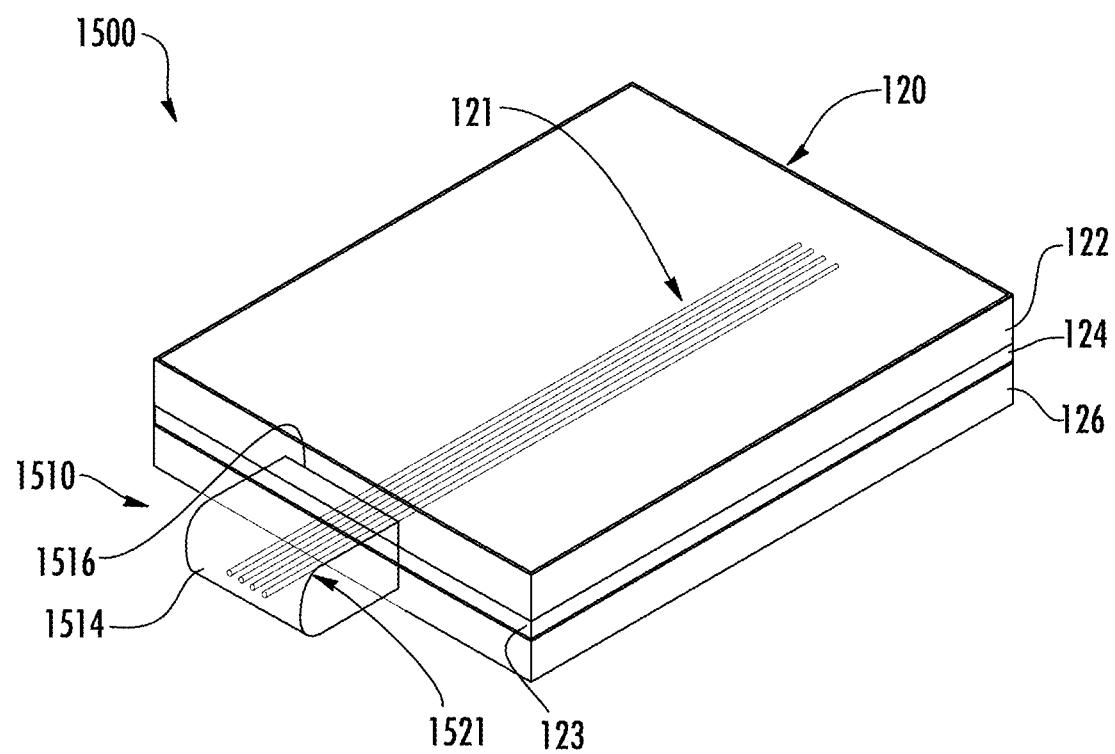
FIG. 15 schematically depicts a perspective view of an example optical assembly including a glass waveguide connector element that is drawn perpendicular to its optical axis, and an optical printed circuit board according to one or more embodiments described and illustrated herein.

Because expanded beam interconnections relax ferrule surface dimension requirements, it may be possible to create sufficiently accurate connector elements that are drawn perpendicular to the optical axis (as opposed to parallel). FIG. 15 schematically depicts an example optical assembly comprising a glass waveguide connector element 1510 that is drawn perpendicular to its optical axis. The glass waveguide connector element 1510 includes optical waveguides 1521, an end face 1516, and a front end face 1514. This approach may provide better control of the front edge radius at the front end face 1514, and may eliminate glass substrate sawing and polishing steps required to smooth the front end face. The curvature of the front end face 1514 may be locally modified to improve contact at waveguide or taper locations to minimize air gaps and associated coupling losses due to interference fringes.

Figure 16A:
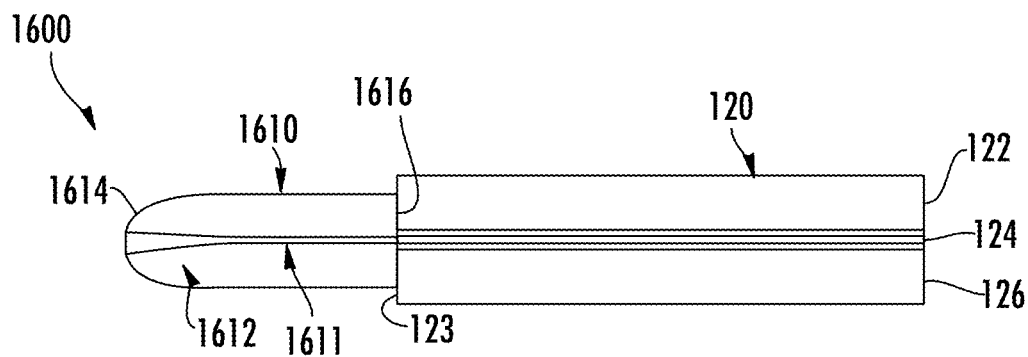
FIG. 16A schematically depicts a side view of an example optical assembly including a glass waveguide connector element that is drawn perpendicular to its optical axis, and an optical printed circuit board according to one or more embodiments described and illustrated herein.

FIG. 16A depicts a side view of an optical assembly 1600 similar to that depicted in FIG. 15, wherein the drawn glass waveguide connector element 1610 includes beam expanding lenses 1612 and laser written optical waveguides 1611.

Figure 16B:
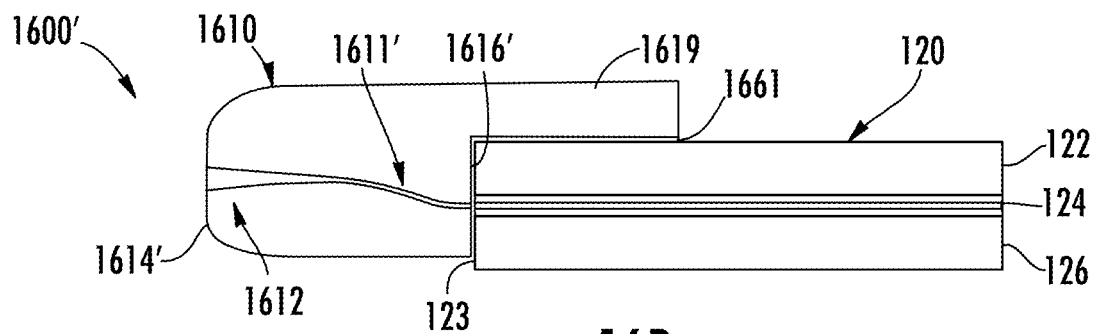
FIG. 16B schematically depicts a side view of an example optical assembly including a glass waveguide connector element that is drawn perpendicular to its optical axis and includes a step feature, and an optical printed circuit board according to one or more embodiments described and illustrated herein.
Figure 16C:
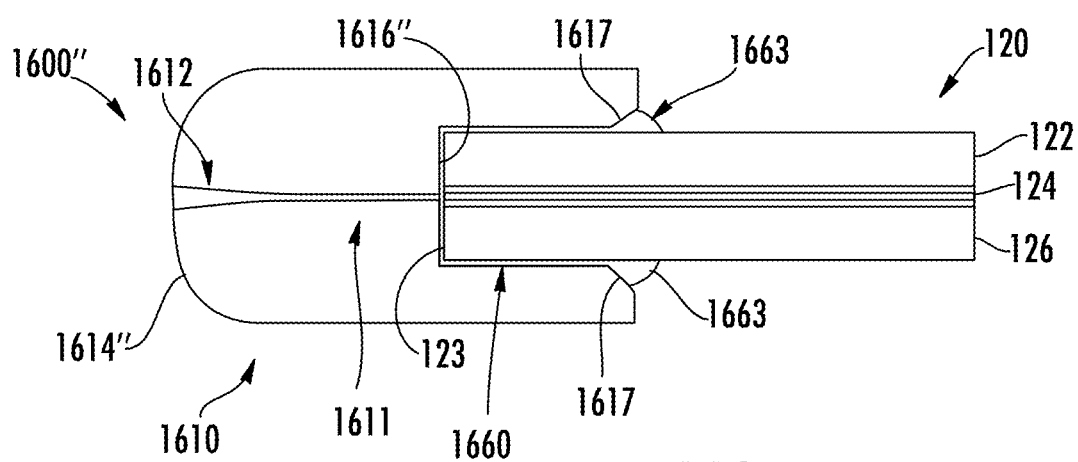
FIG. 16C schematically depicts a side view of an example optical assembly including a glass waveguide connector element that is drawn perpendicular to its optical axis and includes a notch, and an optical printed circuit board disposed in the notch according to one or more embodiments described and illustrated herein.

Fabricating the waveguide connector element by drawing it perpendicular to the optical axis also simplifies the fabrication of steps features 1619 as shown in the waveguide connector assembly 1610' depicted in FIG. 16B, and the slot 1660 and beveled edges 1617 of the waveguide connector assembly 1610" depicted in FIG. 16C for robust joining of the glass waveguide connector element to the optical printed circuit board 120. UV-curable adhesive 1661, 1663 may be utilized to secure waveguide connector element to the optical printed circuit board.

Figure 17A:
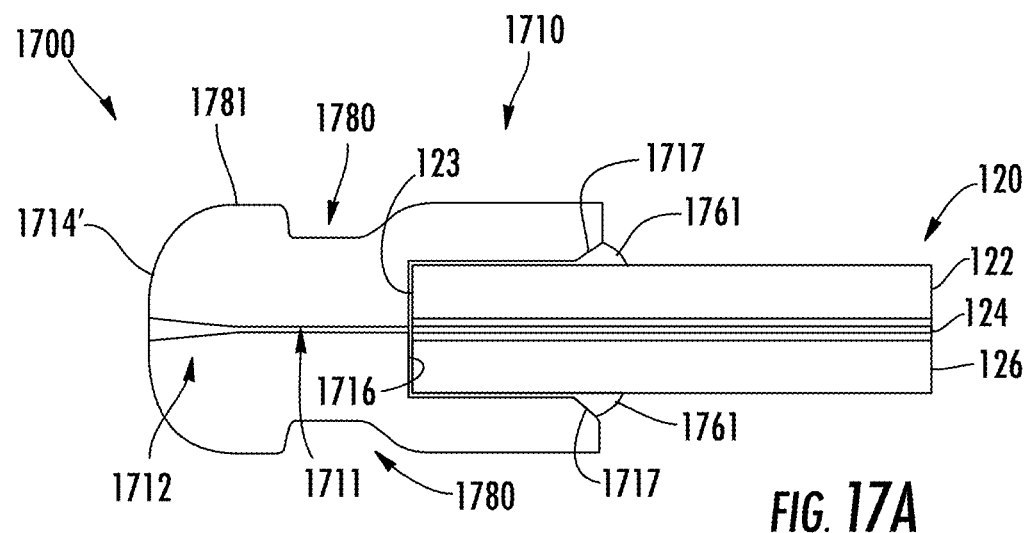
FIG. 17A schematically depicts a side view of an example optical assembly including a glass waveguide connector element that is drawn perpendicular to its optical axis and includes additional mechanical features configured as trenches, and an optical printed circuit board disposed in the notch according to one or more embodiments described and illustrated herein.
Figure 17B:
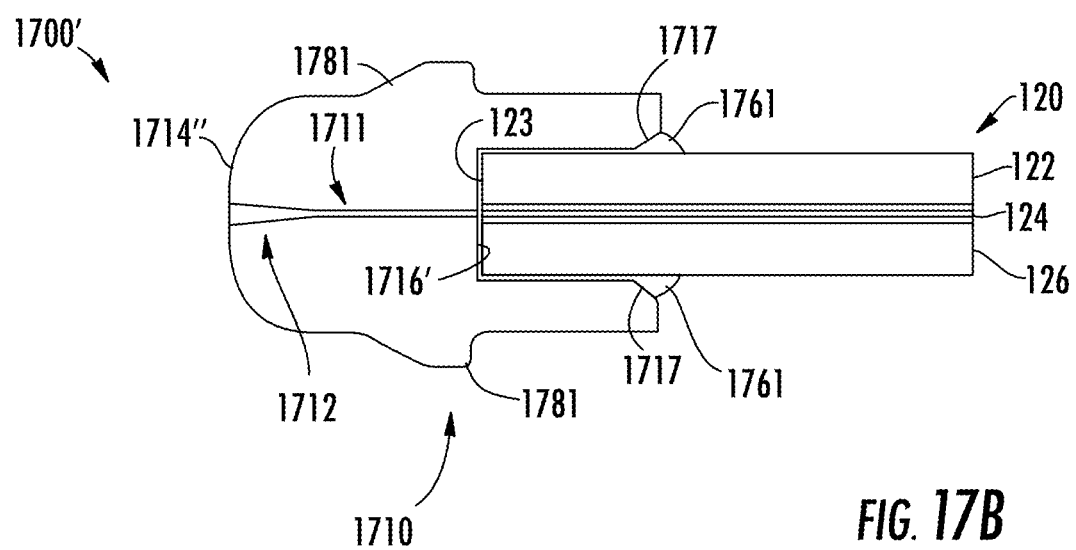
FIG. 17B schematically depicts a side view of an example optical assembly including a glass waveguide connector element that is drawn perpendicular to its optical axis and includes additional mechanical features configured as ridges, and an optical printed circuit board disposed in the notch according to one or more embodiments described and illustrated herein.

Additional features are also possible. FIG. 17A illustrates an optical assembly 1700 comprising a waveguide connector element 1710 further including trenches 1780, while FIG. 17B illustrates an optical assembly 1700' comprising a waveguide connector element 1710' further comprising ridges 1781, which may provide precision mechanical gripping locations for mating with external connectors. This approach could merge mechanical retention and optical alignment functions in a single body, reducing connector size and increasing interface density.

Figure 18A:
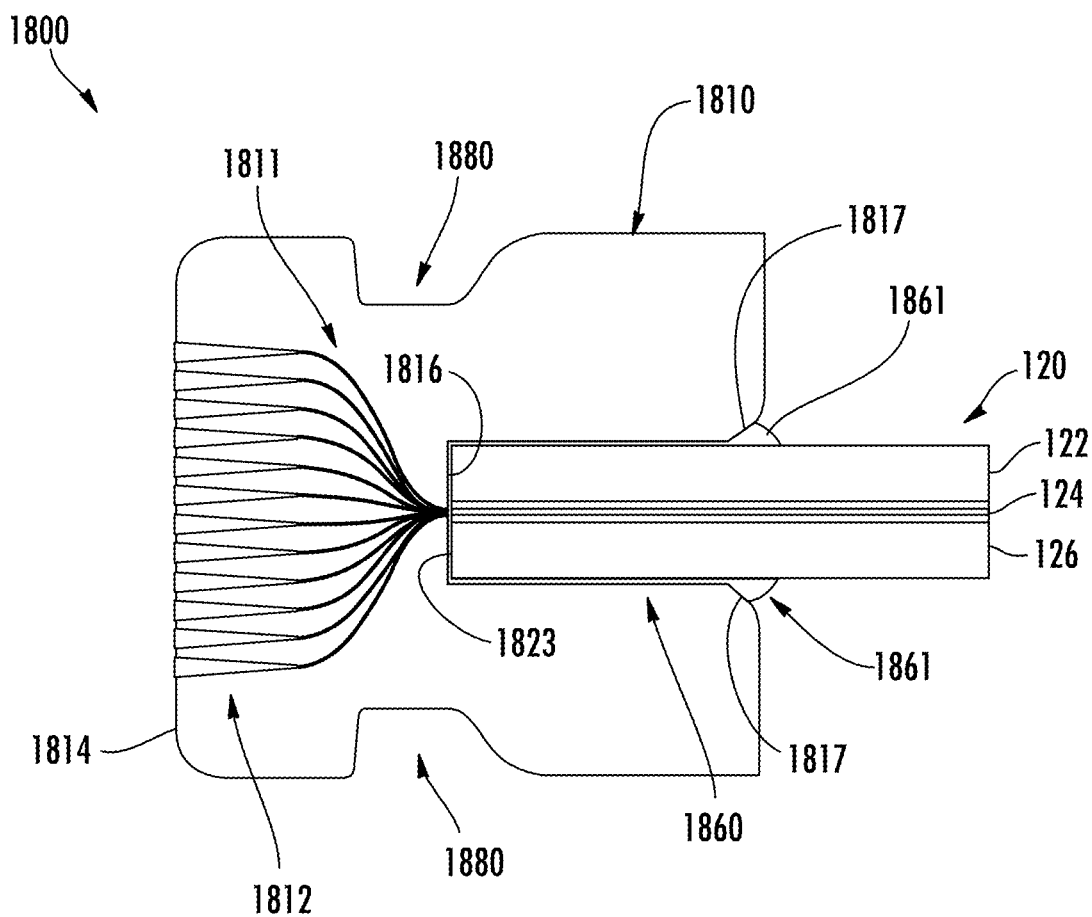
FIG. 18A schematically depicts a side view of an example optical assembly including a glass waveguide connector element that is drawn perpendicular to its optical axis, has an array of vertical optical waveguides, and includes additional mechanical features configured as trenches, and an optical printed circuit board disposed in the notch according to one or more embodiments described and illustrated herein.

FIGS. 18A and 8B schematically illustrate larger drawn glass waveguide connector elements 1810 for distributing a large number of lenses 1812 and optical waveguides 1811 in a direction perpendicular to the plane defined by the optical printed circuit board 120 for increased density. The example waveguide connector element 1810 also includes trenches 1880 (or other mechanical features) for precision mechanical gripping locations, a slot 1860 for receiving the optical printed circuit board 120 such that the edge 123 contacts the end face 1816 of the waveguide connector element 1810. The entrance to the slot 1860 of the example waveguide connector element 1810 further includes beveled edges 1817 that may be utilized for the application of a UV-curable adhesive 1861. The waveguide connector element 1810 may be made thin or thick depending on optical printed circuit board edge density and mechanical strength requirements (e.g., lateral side pull requirements). FIG. 18C depicts a plurality of vertical glass waveguide connector elements 1810A-1810C coupled to an edge 123 of the optical printed circuit board 120.

Figure 18B:
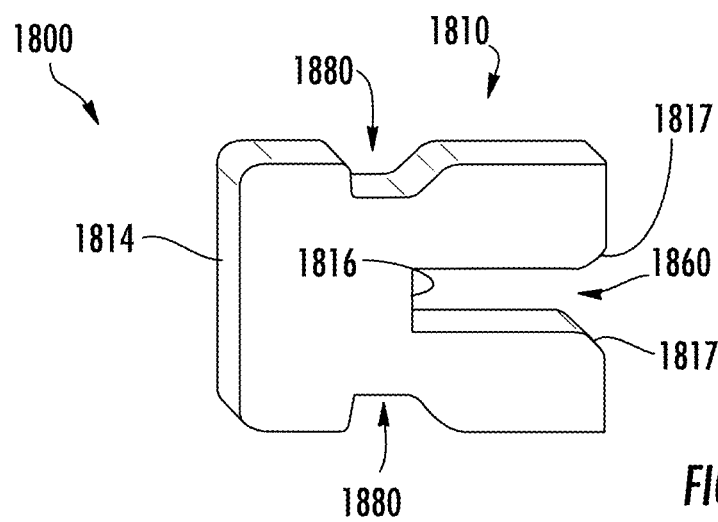
FIG. 18B schematically depicts a perspective view of the waveguide connector element depicted in FIG. 18A according to one or more embodiments described and illustrated herein.
Figure 18C:
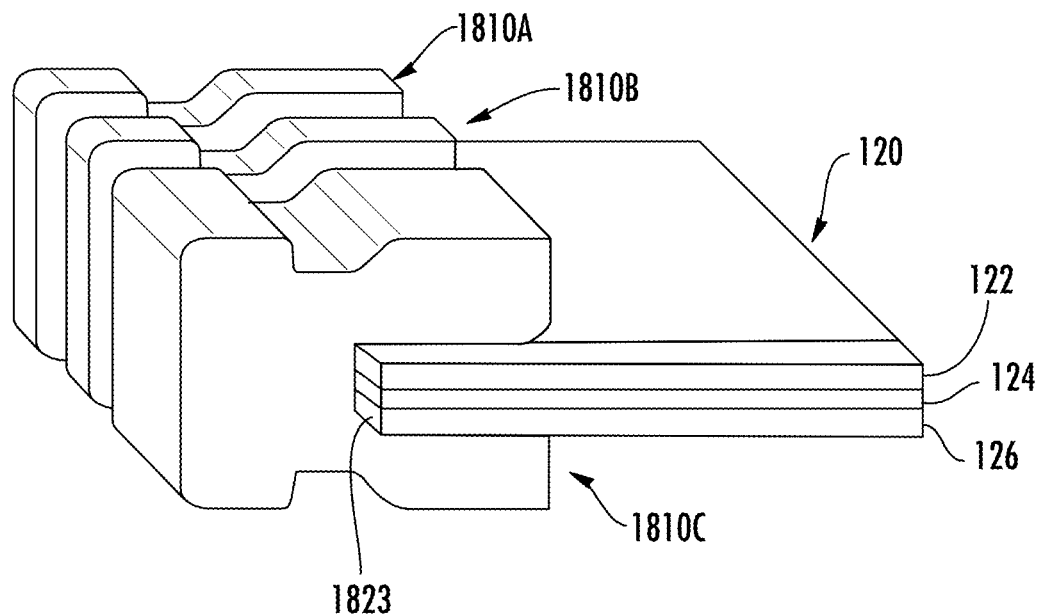
FIG. 18C schematically depicts a perspective view of the example optical assembly wherein the optical assembly comprises a plurality of waveguide connector elements according to one or more embodiments described and illustrated herein.
Figure 19A:
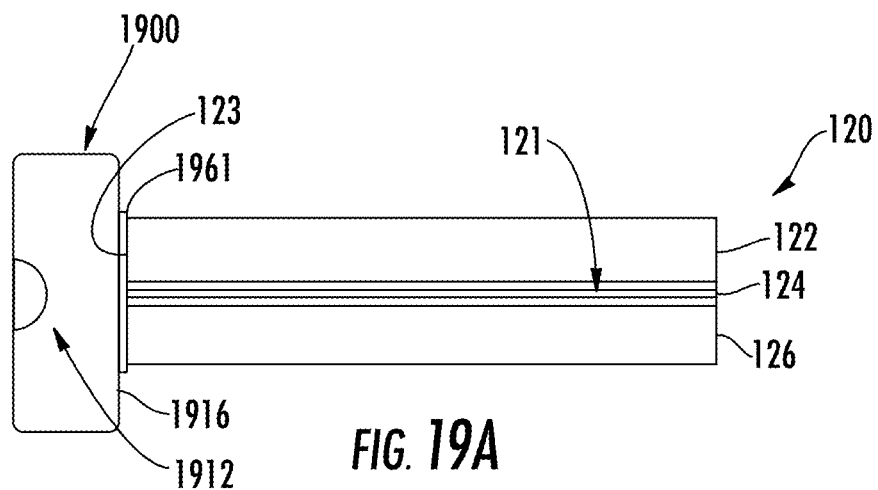
FIG. 19A schematically depicts a side view of an example optical assembly comprising a waveguide connector element optical coupled to an optical printed circuit board, wherein the waveguide connector element is thicker than the optical printed circuit board in a vertical direction according to one or more embodiments described and illustrated herein.
Figure 19B:
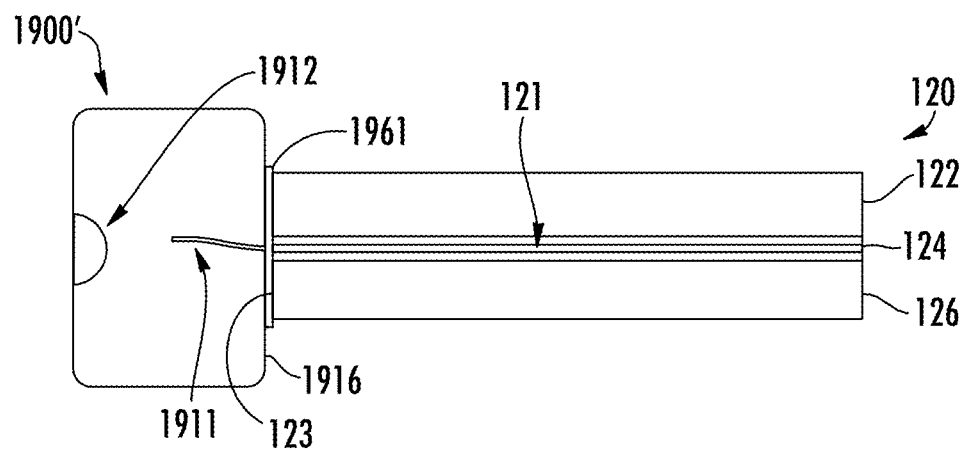
FIG. 19B schematically depicts a side view of another example optical assembly comprising a waveguide connector element optical coupled to an optical printed circuit board, wherein the waveguide connector element is thicker than the optical printed circuit board in a vertical direction according to one or more embodiments described and illustrated herein.

FIGS. 19A and 19B schematically illustrate a more simplified version the larger perpendicular drawn glass waveguide connector element 1810 depicted in FIGS. 18A-18C. In FIGS. 19A and 19B a precision drawn glass waveguide connector element 1900 (or glass sheet) includes an array of lenses 1912 fabricated on a precise pitch. By making the waveguide connector element 1900 thicker than the optical printed circuit board 120 in the vertical direction, the non-lens face 1916 of the waveguide connector element 1900 may be gripped by external connector hardware (not shown). FIG. 19B depicts a waveguide connector element 1900' that is thicker in the horizontal direction than the waveguide connector element 1900 depicted in FIG. 19A and further includes an optical waveguide. Glass substrates drawn perpendicular to optical axis could also be drawn so that precision perimeter features lie in the plane of the optical printed circuit board if needed.

Figure 20:
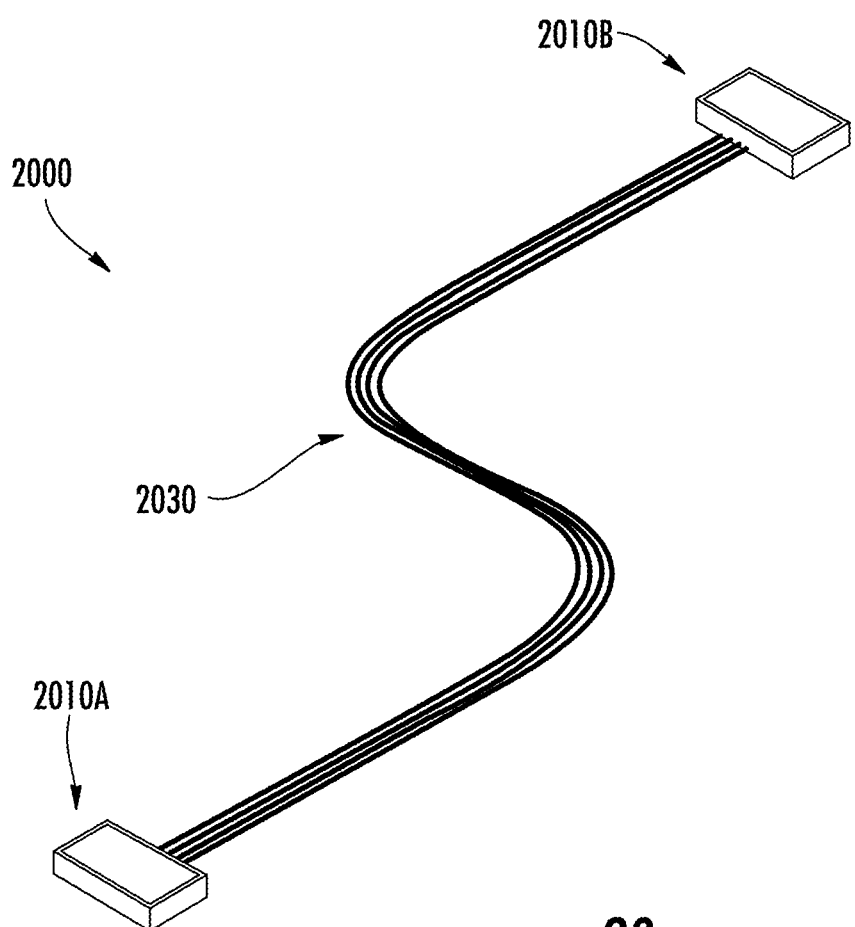
FIG. 20 schematically depicts a perspective view of an example optical cable assembly according to one or more embodiments described and illustrated herein.

While the embodiments described above are directed to waveguide connector elements attached around the perimeter of a rigid optical printed circuit board, such waveguide connector elements with laser written optical waveguides may also be used as a low-cost, compact alternative to existing MTP array optical connectors. FIG. 20 schematically illustrates a fiber optic cable assembly 2000 comprising an array of optical fibers 2030 coupled to a first waveguide connector element 2010A and a second waveguide connector element 2010B.

There are several methods for fabricating the fiber optic cable assembly 2000 shown in FIG. 20. In one embodiment, the waveguides within glass waveguide connector elements are written between one end face (where optical fiber cores will eventually be located on fixed pitch) and the opposite end face, where waveguides are arranged in an array (e.g., a one dimensional or dimensional array). The ends of the optical fibers 2030 are then mounted in precise V-groove blocks (not shown). The optical fiber ends are then actively aligned to waveguide connector element waveguides and joined to the waveguide connector element 2010A, 2010B by a UV-curable adhesive.

In an alternative embodiment, the optical fibers 2030 are mounted in a coarse fiber handler (not shown) without precision placement and with or without stripping of the fiber coating. The ends of the optical fibers 2030 are attached to a face of the waveguide connector elements 2010A, 2010B by a UV-curable adhesive. The location of the optical fiber cores on end faces of the waveguide connector elements 2010A, 2010B are determined. Waveguides are then written within the waveguide connector elements 2010A, 2010B between the optical fiber core locations and the opposite face of the waveguide connector elements 2010A, 2010B, where waveguides are arranged in an array (e.g., a one dimensional array or a two dimensional array).

Multicore fibers provide parallel optical links in a compact form, but they can be expensive to fabricate because of challenges in precise positioning of all cores. Laser written optical waveguide connector elements may be used as an interface block that converts coarsely aligned core locations within a multicore optical fiber to precisely located cores across the waveguide connector element end face. By relaxing the core alignment requirements for multicore fibers, multicore fiber assemblies may be able to be produced at a lower cost, providing a practical path to higher density optical links with minimal fiber count for improved handling, flexibility, and insertion into, on, or over optical printed circuit boards.

It should be understood that all of the fabrication techniques described above for glass waveguide connector elements for optical printed circuit boards may also be applied to glass waveguide connector elements for use in optical fiber applications.

When optical fibers are polished, material removal in the core region is less than the surrounding cladding region. This difference in material removal causes the core region to extend beyond the surrounding cladding region by 50-200 nm. When two optical fibers are forced into contact with each other within mated connectors, the slightly raised core regions make contact. Axial compression forces distort the raised core region so that no air gap exists across the core. This prevents optical coupling losses due air gap interference fringes.

If the end face of the waveguide connector elements described herein is polished flat, laser written optical waveguide locations may not be preferentially polished at a slower rate than surrounding glass. Therefore, when two connectors are mated and their glass ferrules with internal laser written optical waveguides are forced into contact with each other, variations in polishing flatness across the end face of the waveguide connector elements may lead to air gaps that fall in line with waveguide array locations. These gaps can lead to unwanted insertion loss variations due to interference fringes.

Laser bumps may be fabricated on glass surfaces using focused spots of continuous wave ("CW") pulses of 1550 nm light (from, for example, a fiber laser). Laser bumps can be fabricated on a variety of doped glasses, including liquid crystal display ("LCD") glasses, and that bump height varies linearly with pulse power and duration. Laser bumps with heights of less than 1 µm may be fabricated, and bump diameters can be adjusted from 50 to 250 µm in diameter by varying laser focusing depth and lens numerical aperture.

Figure 21A:
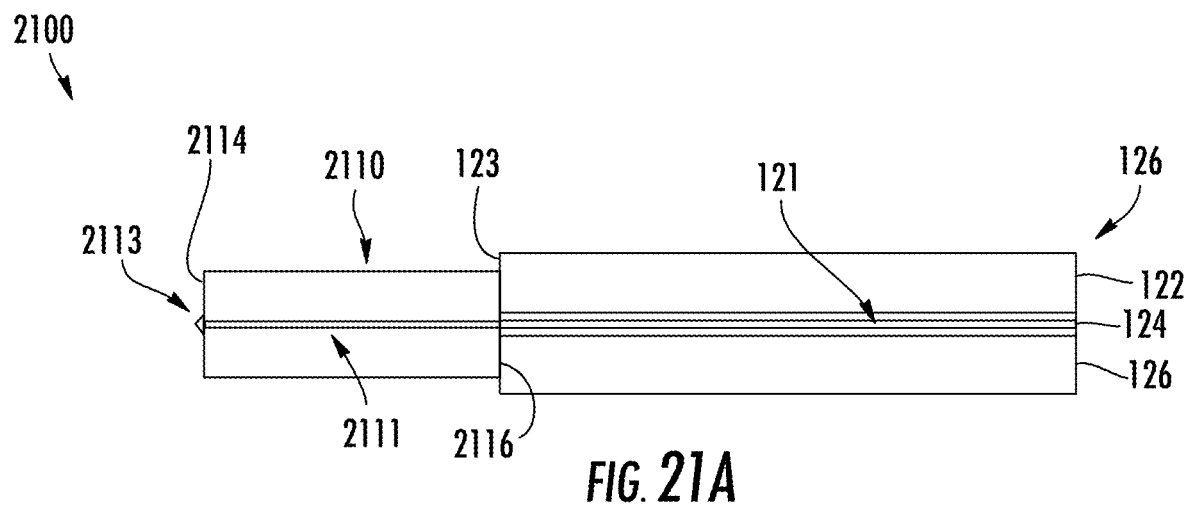
FIG. 21A schematically depicts a side view of an example waveguide connector element optical coupled to an optical printed circuit board, wherein an end face of the ferrule connector includes a laser bump, according to one or more embodiments described and illustrated herein.
Figure 21B:
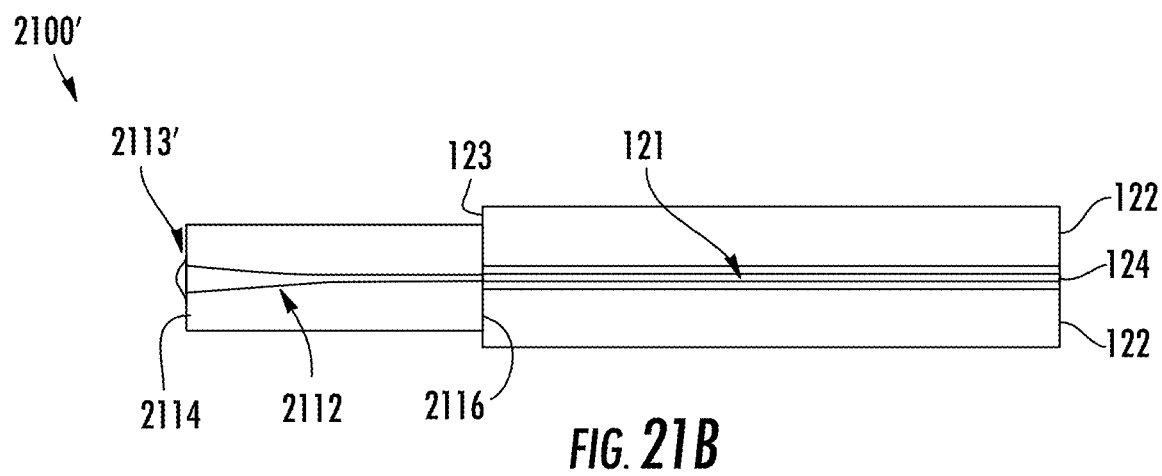
FIG. 21B schematically depicts a side view of an example waveguide connector element optical coupled to an optical printed circuit board, wherein an end face of the ferrule connector includes a laser bump and a beam expansion lens, according to one or more embodiments described and illustrated herein.

One solution for providing slightly raised regions over waveguide connector element waveguide locations is to use a laser to rapidly create an array of bumps. FIG. 21A schematically illustrates an optical assembly 2100 comprising a waveguide connector element 2110 having a laser bump 2113 at the end face 2114 and aligned with an optical waveguide 2111. FIG. 21B schematically illustrates a similar optical assembly 2100' comprising a waveguide connector element 2110' having a larger diameter laser bump 2113' at the end face 2114 and aligned with a laser written optical waveguide taper (e.g., a lens). Each laser bump may be precision aligned to the target end face waveguide location by backlighting the waveguide connector element waveguides and using a vision system to located the waveguide core, for example.

Low loss waveguides can be fabricated in large volume over meter-size glass sheets using ion exchange batch processing. The process creates planar waveguides that are integrated in glass substrates close to the surface. Exchange of ions occurs through the glass surface by deposition of ionic sources like metal films on the glass surface, e.g. silver or melted salt bathes containing, for example, Ag+ or K+ ions. The ion exchange waveguide depth is limited due to the isotropic diffusion characteristic of the glass material. By applying field assisted ion exchange, the waveguides can be buried deep into the glass but, the process imposes limitations regarding numerical aperture and dimensional control. The maximum number of layers for ion exchange waveguides is two, using dual side thermal waveguide processing. The distance between the waveguide layers is dependent on glass thickness and the distance may difficult to control because of tolerances in glass sheet fabrication.

There are several reasons why it may be important to be able to create one dimensional and two dimensional waveguides deep within the glass substrate, as opposed to near the surface as for ion exchanged waveguides. For interconnection to two dimensional fiber arrays or multi-fiber connectors (e.g. MT type), the fiber pitch should be the same in both dimensions (e.g., 250 µm×250 µm). Because the ion exchange waveguide fabrication process is only able to produce a one dimensional array near the glass sheet surface, it is not possible to create precision two dimensional arrays on pitches suitable for optical fiber interconnections because of variation in sheet thickness and misalignment between ion exchanged waveguide layers.

Further, ion exchange waveguides are located close to the glass substrate edge, where coupling loss is dependent on edge quality. For example, glass edge chips created during dicing, polishing, scoring and breaking operations can introduce defects that cause scattering losses.

It may be important to move the fiber interface two dimensional waveguide array toward the middle of the glass substrate edge face to increase the mechanical bonding area at the fiber array interface to the glass substrate. Fiber array interfaces that are joined near the top surface of the glass substrate will not be mechanically robust unless additional reinforcement materials or substrates are bonded to the top surface of the glass sheet.

Figure 22A:
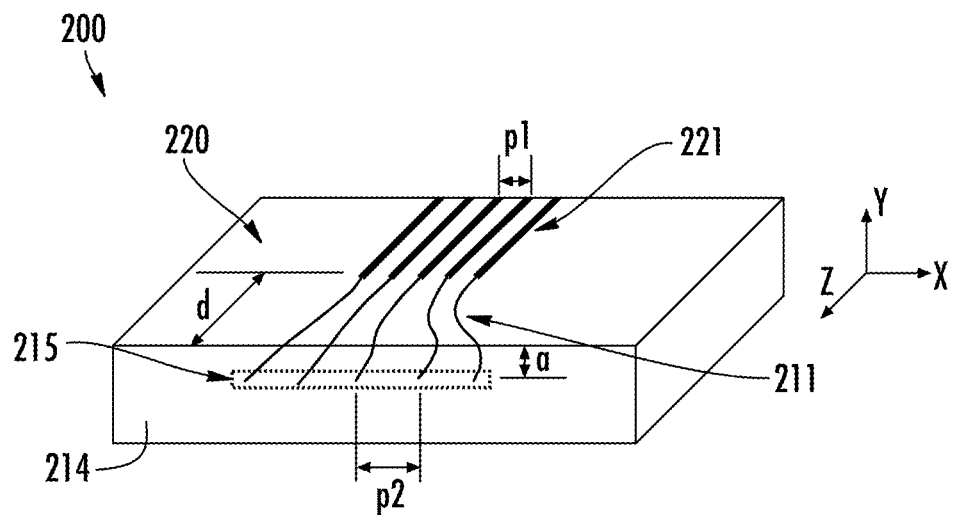
FIG. 22A schematically depicts an example glass substrate having laser written fan-out waveguides according to one or more embodiments described and illustrated herein.

To solve these problems, laser written optical waveguides 211 can be created near the edge 214 of a glass substrate 220 to form a link between ends of ion exchange waveguides 221 ends near the surface 225 of the glass substrate 220 and an optical port 215 on the edge face 214 of the glass substrate, as shown in FIG. 22A. In this example, the optical port 215 is formed by a one dimensional array of laser written fan-out waveguides 211 that terminate at the edge face 214 of the glass substrate 220. Typically, each laser written fan-out waveguide 211 follows a path that is displaced both normal to and parallel to the glass substrate plane.

Displacements normal to the glass substrate plane (parallel to Y-axis, vertical direction in FIG. 22A) are used to translate the laser written fan-out waveguide 211 from the ion exchanged waveguide 221 end near the top surface 225 of the glass substrate 220 to the optical port location 215, which can be offset a distance away from the top surface 225 of the glass sheet.

Displacements parallel to the glass substrate plane (parallel to X-axis, horizontal in FIG. 22A) may be provided to accommodate differences in pitch between the ion exchange waveguides 221 (which may be arranged on fine pitch p1 (e.g., 25-40 µm) to enable high density glass substrate optical links, and the optical port 215 waveguides 211, which are arranged on a different pitch p2 (e.g., 127 or 250 µm).

The ion exchanged waveguides 221 end a sufficient distance d away from the glass substrate edge 214 to allow the laser written optical waveguides 211 to bend through low-loss large radius turns as they simultaneously introduce these normal and parallel displacements along the path between the ion exchanged waveguide 221 ends and the glass sheet edge optical port 215.

Ion exchanged waveguide ends visible via optical inspection can be used as fiducial marks for aligning laser written fan-out waveguides 211. Optical characterization of glass substrate top surface 225 and edge surface 214 can also be used to provide datum surfaces for laser written optical waveguide alignment.

Figure 22B:
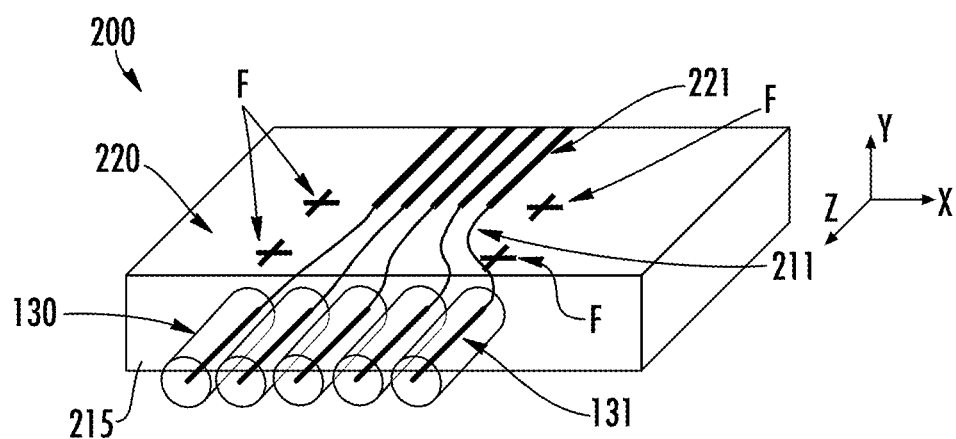
FIG. 22B schematically depicts the glass substrate illustrated in FIG. 22A optically coupled to a one dimensional optical fiber array according to one or more embodiments described and illustrated herein.

Fiducial marks F may also be fabricated on the surface 225 of the glass substrate 220 that are aligned to the ends of the ion exchanged waveguides 221, as shown in FIG. 22B. These fiducial marks may be fabricated at the time of ion exchange waveguide 221 formation using ion exchange processes, such as patterning of a masking layer on the glass surface that gives high position accuracy because fiducial marks and position of waveguides are defined in same process step. Alternatively, the fiducial marks may be created before or after ion exchanged waveguide 221 fabrication using a separate photolithographic patterning process (e.g., surface metallization or photoresist features) that is aligned to ion exchanged waveguide locations. When the laser written fan-out waveguides are created a vision system can be used to image the fiducials so that, based on known offset distances between the fiducials and optical features (e.g., the ion exchanged waveguide ends or the edge of the glass substrate 220), the laser written optical waveguides 211 can be created in precise locations within the glass substrate 220. This allows the laser written fan-out waveguides 211 to be aligned to the ends of the ion exchanged waveguide 221 at one end, and to optical port 215 waveguide array locations at the other end.

Fiducial marks F may also be created close to the edge 214 of the glass substrate 220 to serve as reference locations for optical port 215 laser written fan-out waveguide 211 positioning. Fiducial marks may also be used to help precisely align a one dimensional fiber array 130 to the optical port 215 waveguide locations, as shown in FIG. 22B.

Figure 23A:
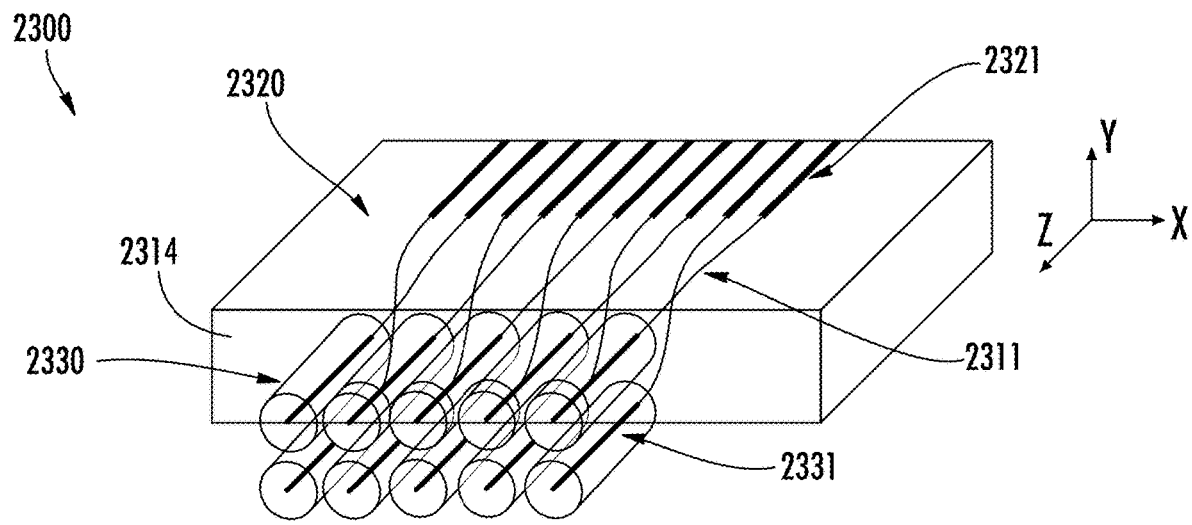
FIG. 23A schematically depicts an example glass substrate having laser written fan-out waveguides optically coupled to a two dimensional optical fiber array according to one or more embodiments described and illustrated herein.

Referring now to FIG. 23A, by forming laser written fan-out waveguides 2311 at different depths, a one dimensional ion exchanged waveguide array 2321 to a two dimensional optical fiber array fan-out structure 2311 can be fabricated in a glass substrate 2320. Since the two dimensional fiber array interface defined by the laser written optical waveguides 2311 falls completely on the edge face 2314 of the glass substrate 2320, a robust mechanical bond can be formed between the optical fiber array interface 2330 and the edge face 2314 of the glass substrate.

In addition to serving as pitch converters between one dimensional ion exchanged waveguides and one or two dimensional optical port waveguides, the diameter and index of refraction of the laser written optical waveguides can be modified along their length so that they serve as low-loss mode field converters.

Figure 23B:
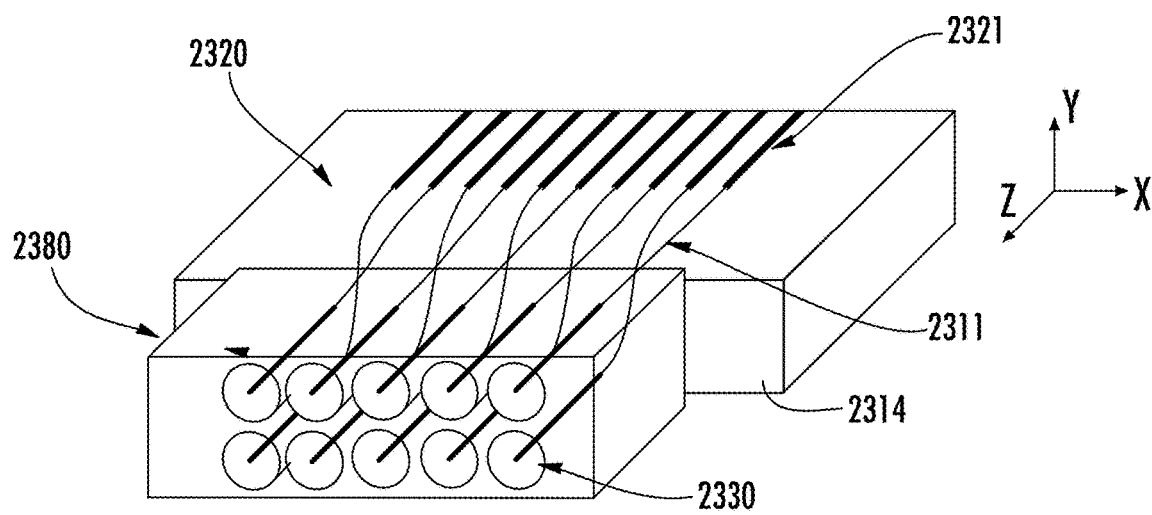
FIG. 23B schematically depicts the example glass substrate illustrated in FIG. 22A coupled to a connector housing according to one or more embodiments described and illustrated herein.

The laser written fan-out waveguides 2311 can also be used to provide an interface with an MT type optical fiber connector 2380, as shown in FIG. 23B. The MT connector 2380 can be fabricated from a low-expansion filled plastic material, or a material that is matched to the coefficient of thermal expansion of the glass substrate, such as glass or silicon V-groove materials. The MT type connector 2380 can be aligned and permanently attached to the edge face 2314 of the glass substrate 2320, so that it presents an optical fiber array and precision surfaces (e.g., alignment pins) for making connections with mating MT type connectors.

The MT type connector 2380 can also be aligned to the edge face 2314 of the glass substrate 2320, either permanently or temporarily for demateable connections by including notches or bosses on the MT type connector 2380 that mate with corresponding features machined into the glass substrate. MT type connector alignment can also be provided by precision holes (not shown) in the glass substrate 2320 that receive alignment pins (not shown), so that the alignment pins also engage precision holes formed in the MT type connector.

Figure 24:
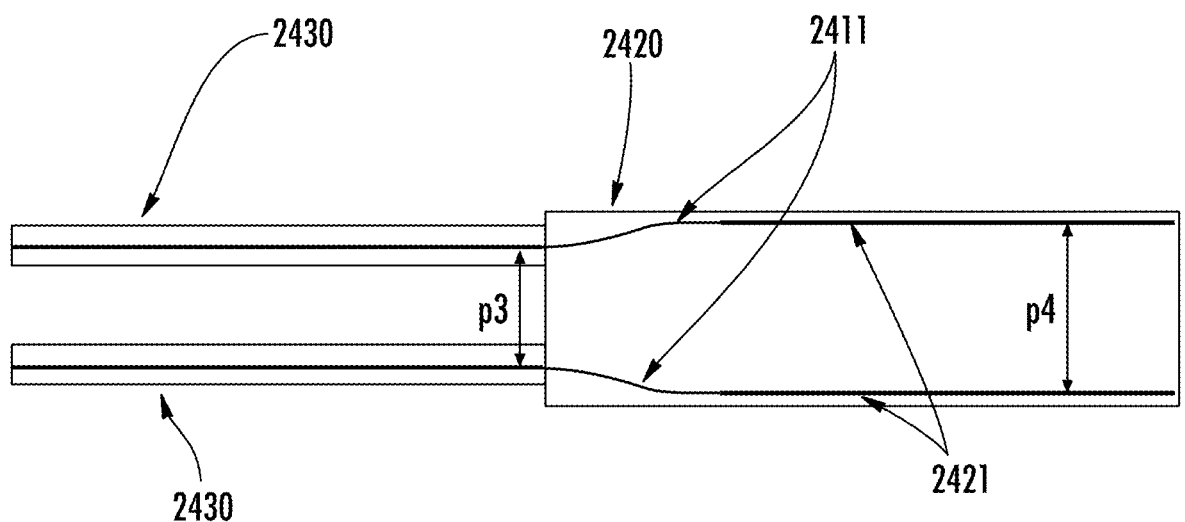
FIG. 24 schematically depicts a side view of an example waveguide connector element including a two dimensional array of laser written optical waveguides optically coupled to pre-existing ion exchanged optical waveguides, and a two dimensional optical fiber array according to one or more embodiments described and illustrated herein.

Referring now to FIG. 24, the laser written optical waveguides 2411 are buried in the direction of the glass substrate center, which allows accurate and small waveguide pitches p3 for glass substrates 2420 with doubled-sided ion exchanged waveguides 2421 with larger waveguide pitch p4 for the two dimensional optical fiber 2430 or connector interface (optical port). Double-sided ion exchanged waveguides 2421 are independent on glass thickness variation and glass thickness at all to match two dimensional fiber pitches (e.g., as non-limiting examples, p3=127 µm or p3=250 µm).

Figure 25:
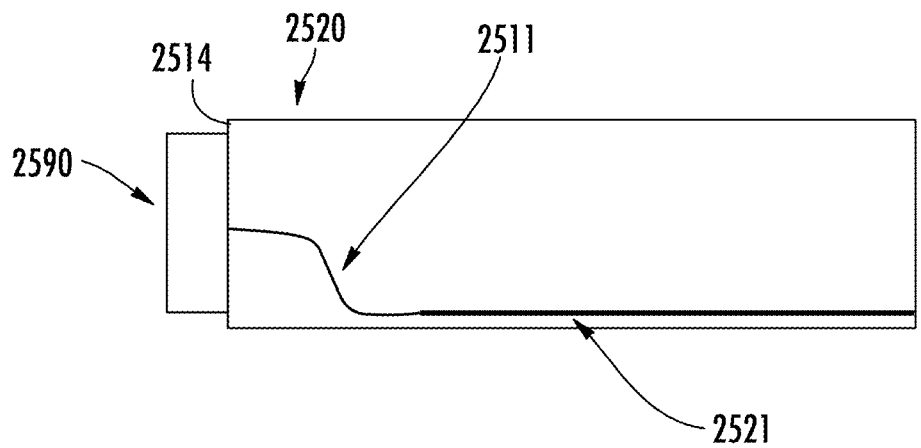
FIG. 25 schematically depicts a side view of an example electro-optical device attached to an end face of an example glass substrate according to one or more embodiments described and illustrated herein.
Figure 26:
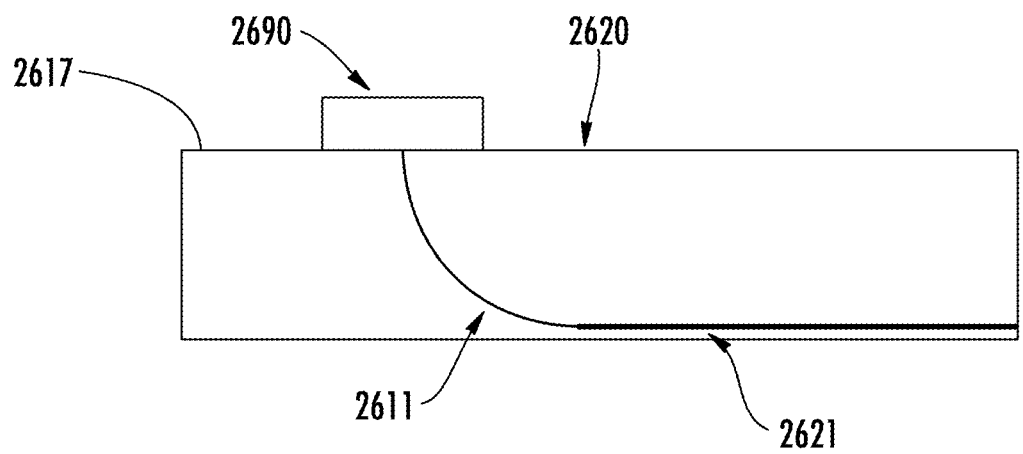
FIG. 26 schematically depicts a side view of an example electro-optical device attached to a surface of an example glass substrate according to one or more embodiments described and illustrated herein.

The glass substrate 2520 having laser written fan-out waveguides 2511 can also interconnect waveguides 2521 and optical or electro-optical devices 2590 attached to the glass substrate end face 2514 as shown in FIG. 25, or to a glass surface 2620, as shown in FIG. 26. For interconnections perpendicular to the glass surface 2620 or at a certain angle (e.g. 8 or 10 degree), the laser written fan-out element structure defined by the waveguides 2511 includes an arc bend and therefore requires a glass thickness that allows low loss bends in range of 2 mm or larger.

The example laser written fan-out waveguide solutions shown above can be applied to a variety of optical interconnection applications. The optical port on the glass substrate edge face can provide an interface to bare fibers, arrays of fibers, fiber alignment V-groove structures, lens array substrates, standard or non-standard optical connectors, or free space links. The glass substrate laser written fan-out waveguides may be configured as a part of a large-size opto-electronic substrate, such as an optical printed circuit board or other support substrate for multiple photonic chips and electronic chips, where the opto-electronic substrate may be embedded in or on a printed circuit board or serve as a stand-alone component. The glass substrate laser written fan-out waveguides may be configured as a medium size opto-electronic substrate, such as a glass interposer or daughterboard for a larger printed circuit board, or as a small size opto-electronic substrate, such as would be found in an optical transceiver for supporting photonic and electronic chips.

Embodiments described herein may provide for a small passive glass connector component designed for providing an optical interface to a photonic chip, where the glass connector component converts optical fiber array waveguides on large pitch to compact pitch ion exchanged waveguides for passive alignment to photonic chip surface waveguides. This glass connector component may be permanently attached to the photonic chip, or configured as a demateable connector. The small passive glass connector component may also be designed as an identical or mirror image passive glass connector component, so that the two connector components can be aligned to each other similar to the way MT type connectors are joined, using precision surfaces provided on the exterior (e.g., flat faces) or interior (e.g., holes that receive alignment pins).

Embodiments may also be configured as a glass sheet substrate of any size that provides additional functions, such as polished 45° total internal reflection ("TIR") surfaces for right angle optical bends, integrated lenses, and/or mechanical features that make it operate as a demateable connector.

While most figures depict ion exchanged waveguides only on the top surface of the glass substrate, similar ion exchanged waveguides can simultaneously be fabricated on the bottom surface of the glass substrate. Laser written fan-out waveguides can be routed from top and/or bottom surface ion exchanged waveguide ends or both to an optical port location on the glass sheet edge face or to the glass surface.

Further, the fan-out element provided by the laser-written glass substrate can also be used as fan-in element or a bi-directional element.

Additional process variations may be applied to any of the examples described herein. For example, precise side features and holes may also be created via laser hole drilling and/or cleaving processing. Notches and/or holes for mechanical latching on surfaces not profiled by draw process may be provided. Notches forming multiple cantilevered arms along interfaces between the glass waveguide connector element and materials with different coefficient of thermal expansion ("CTE") (e.g., optical printed circuit board materials) may also be provided. Further, drawn glass ferrules may also be fabricated in a glass with better or identical CTE match to printed circuit board.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A waveguide connector element comprising:
    a first end face and a second end face;
    a pre-existing optical waveguide within or on a surface of the waveguide connector element;
    a laser written optical waveguide optically coupled to an end of the pre-existing optical waveguide and extending toward one of the first end face and the second end face; and
    a notch for receiving an optical printed circuit board,
    wherein the waveguide connector element is a glass waveguide connector element drawn in a direction perpendicular to an optical axis of the waveguide connector element.

2. The waveguide connector element of claim 1, wherein the laser written optical waveguide has a parallel displacement parallel to the waveguide connector element and a normal displacement normal to the waveguide connector element.

3. The waveguide connector element of claim 1, wherein the pre-existing optical waveguide is one of an ion exchanged optical waveguide, a planar glass dielectric waveguide, an embedded optical fiber waveguide, and a polymer waveguide.

4. The waveguide connector element of claim 1, wherein the pre-existing optical waveguide terminates at one of the first end face and the second end face.

5. The waveguide connector element of claim 4, further comprises a laser bump at one of the first end face and the second end face and aligned with the pre-existing optical waveguide.

6. The waveguide connector element of claim 1, further comprising a beam expanding lens at the first end face, wherein the beam expanding lens is a tapered structure that decreases in diameter from the first end face toward the second end face, the pre-existing optical waveguide extends from the second end face, the laser written optical waveguide optically couples the beam expanding lens to the pre-existing optical waveguide.

7. The waveguide connector element of claim 6, further comprising a laser bump at the first end face and aligned with the beam expanding lens.

8. The waveguide connector element of claim 6, wherein the beam expanding lens is one of an ion exchanged lens, a thermally extending core, and a laser written lens.

9. The waveguide connector element of claim 6, wherein the beam expanding lens is one of a plurality of beam expanding lenses having a first pitch, and the pre-existing optical waveguide is one of a plurality of plurality of pre-existing optical waveguides having a second pitch, and the first pitch is greater than the second pitch.

10. The waveguide connector element of claim 1, further comprising a step feature.

11. The waveguide connector element of claim 1, wherein the first end face of the waveguide connector element is curved.

12. The waveguide connector element of claim 1, further comprising a mechanical feature.

13. The waveguide connector element of claim 12, wherein the mechanical feature is at least one of a ridge and a trench.

14. A waveguide connector element comprising:
    a first end face and a second end face;
    a two-dimensional array of beam expanding lenses at the first end face, wherein the beam expanding lens is a tapered structure that decreases in diameter from the first end face toward the second end face; and
    a one-dimensional array of waveguides at the second end face, wherein the one-dimensional array of waveguides is optically coupled to the two-dimensional array of beam expanding lenses,
    wherein the one-dimensional array of waveguides is a one dimensional array of laser written optical waveguides and wherein the two-dimensional array of beam expanding lenses has a first pitch, and the one-dimensional array of laser written optical waveguides has a second pitch at the second end face, and the first pitch is greater than the second pitch.

15. The waveguide connector element of claim 14, wherein each beam expanding lens of the two-dimensional array of beam expanding lenses is one of an ion exchanged lens, a thermally extending core, and a laser written lens.

16. The waveguide connector element of claim 14, wherein the one-dimensional array of waveguides is a one-dimensional array of pre-existing waveguides.

17. The waveguide connector element of claim 16, wherein each beam expanding lens of the two-dimensional array of beam expanding lenses is a laser written lens.

18. The waveguide connector element of claim 14, further comprising a step feature.

19. The waveguide connector element of claim 14, wherein the waveguide connector element is a glass waveguide connector element drawn in a direction perpendicular to an optical axis of the waveguide connector element.

20. The waveguide connector element of claim 19, wherein the first end face of the waveguide connector element is curved.

21. The waveguide connector element of claim 14, further comprising a mechanical feature.

22. The waveguide connector element of claim 21, wherein the mechanical feature is at least one of a ridge and a trench.

23. The waveguide connector element of claim 14, further comprising a notch for receiving an optical printed circuit board.

24. A waveguide connector element comprising:
a first end face and a second end face;
a two-dimensional array of beam expanding lenses at the first end face, wherein the beam expanding lens is a tapered structure that decreases in diameter from the first end face toward the second end face; and
a one-dimensional array of waveguides at the second end face, wherein the one-dimensional array of waveguides is optically coupled to the two-dimensional array of beam expanding lenses,
wherein the one-dimensional array of waveguides is a one dimensional array of laser written optical waveguides, and wherein the one-dimensional array of laser written optical waveguides has a parallel displacement in a plane parallel to the optical printed circuit board and a normal displacement in a plane normal to the optical printed circuit board within the waveguide connector element.

* * * * *